US012811237B2

(12) United States Patent
Guglielmo

(10) Patent No.: US 12,811,237 B2
(45) Date of Patent: Nov. 24, 2026

(54) LITHIUM-ION BATTERY CHARGING SYSTEM FOR FORK LIFTS

(71) Applicant: Ethium, LLC, San Antonio, TX (US)

(72) Inventor: Kennon Guglielmo, San Antonio, TX (US)

( * ) Notice: Subject to any disclaimer, the term of this patent is extended or adjusted under 35 U.S.C. 154(b) by 0 days.

(21) Appl. No.: 19/056,057

(22) Filed: Feb. 18, 2025

(65) Prior Publication Data

US 2025/0192326 A1 Jun. 12, 2025

Related U.S. Application Data

(63) Continuation of application No. 18/561,029, filed as application No. PCT/US2022/032298 on Jun. 6, 2022, now Pat. No. 12,230,828.

(Continued)

(51) Int. Cl.

*H01M 50/269* (2021.01)
*B60L 50/64* (2019.01)

(Continued)

(52) U.S. Cl.

CPC ........... *H01M 50/269* (2021.01); *B60L 50/64* (2019.02); *B60L 58/12* (2019.02); *B60L 58/19* (2019.02);

(Continued)

(58) Field of Classification Search

CPC ............. H01M 50/269; H01M 50/249; H01M 50/507; H01M 10/425; H01M 10/46;

(Continued)

(56) References Cited

U.S. PATENT DOCUMENTS

2004/0149498 A1 8/2004 Nakashima
2012/0068540 A1 3/2012 Luo (Continued)

FOREIGN PATENT DOCUMENTS

CN 102231546 A 11/2011

OTHER PUBLICATIONS

Extended European Search Report dated Jul. 28, 2025; related EP Appl. No. 22888424.3.

(Continued)

*Primary Examiner* — Carlos Amaya

(57) ABSTRACT

A battery assembly including a housing sized to be replaceably installed within a battery assembly compartment of an electric vehicle. Where a plurality of battery modules are disposed within the housing. The battery assembly includes a battery module charging assembly electrically coupled with a negative module terminal and a positive module terminal of each of the plurality of battery modules and disposed within the battery assembly housing. The battery module charging assembly includes a power supply plug configured to deliver electrical energy from the plurality of battery modules to the electric vehicle, a power charging port configured to be coupled with and receive electrical energy from a power source for charging the plurality of battery modules. The charging assembly further includes control circuitry configured to control charging operations of the battery assembly and a switch configured to connect the plurality of battery modules in parallel or series.

20 Claims, 13 Drawing Sheets

Related U.S. Application Data

(60) Provisional application No. 63/196,813, filed on Jun. 4, 2021.

(51) Int. Cl.

| | |
|---|---|
| ***B60L 58/12*** | (2019.01) |
| ***B60L 58/19*** | (2019.01) |
| ***B60L 58/21*** | (2019.01) |
| ***H01M 10/42*** | (2006.01) |
| ***H01M 10/46*** | (2006.01) |
| ***H01M 10/48*** | (2006.01) |
| ***H01M 50/249*** | (2021.01) |
| ***H01M 50/507*** | (2021.01) |

(52) U.S. Cl.
CPC ........... *B60L 58/21* (2019.02); *H01M 10/425* (2013.01); *H01M 10/46* (2013.01); *H01M 10/48* (2013.01); *H01M 50/249* (2021.01); *H01M 50/507* (2021.01); *B60L 2200/42* (2013.01); *H01M 2010/4278* (2013.01); *H01M 2220/20* (2013.01)

(58) Field of Classification Search
CPC ......... H01M 10/48; H01M 2010/4278; H01M 2220/20; B60L 50/64; B60L 58/19; B60L 58/12; B60L 58/21; B60L 2200/42
See application file for complete search history.

(56) References Cited

U.S. PATENT DOCUMENTS

| | | | |
|---|---|---|---|
| 2013/0164155 A1 | 6/2013 | Ozawa et al. | |
| 2013/0270016 A1* | 10/2013 | Donnell .................. | B60L 50/66 180/2.2 |
| 2017/0125861 A1 | 5/2017 | Machida | |
| 2019/0058336 A1 | 2/2019 | Thompson | |
| 2019/0103639 A1* | 4/2019 | Guglielmo .......... | H01M 10/425 |
| 2019/0300348 A1 | 10/2019 | Wild et al. | |
| 2020/0244090 A1 | 7/2020 | Irish et al. | |
| 2021/0083255 A1 | 3/2021 | Demont et al. | |
| 2021/0261208 A1 | 8/2021 | Claesson et al. | |
| 2022/0352560 A1 | 11/2022 | Guglielmo et al. | |

OTHER PUBLICATIONS

U.S. Appl. No. 17/646,740, Non-Final Office Action issued Sep. 16, 2025.
U.S. Appl. No. 18/030,599, Non-Final Office Action issued Nov. 18, 2025.

* cited by examiner

Fig. 2 – Prior Art

LITHIUM-ION BATTERY CHARGING SYSTEM FOR FORK LIFTS

CROSS-REFERENCE TO RELATED APPLICATIONS

This application is a continuation application of U.S. patent application Ser. No. 18/561,029, filed on Nov. 15, 2023, entitled "LITHIUM-ION BATTERY CHARGING SYSTEM FOR FORK LIFTS", which is a National Stage Entry of International Application Serial No. PCT/US2022/32298, filed on Jun. 6, 2022, entitled "LITHIUM-ION BATTERY CHARGING SYSTEM FOR FORK LIFTS", which claims the benefit of the filing date of U.S. Provisional Application Ser. No. 63/196,813, filed on Jun. 4, 2021, entitled "LITHIUM-ION BATTERY CHARGING SYSTEM FOR FORK LIFTS". The entire disclosure of each of the above-referenced applications is hereby incorporated by reference into the present disclosure.

BACKGROUND

1. Field

The present disclosure relates principally to battery-powered industrial trucks and their rechargeable batteries, as well as to related aspects of their use. More particularly, the disclosure is most directly related to rechargeable battery systems and charging methods for use in Class I-III forklifts but may also find applicability in relation to other classes of battery-powered industrial trucks.

2. Description of Related Art

Before reviewing the particular field of the present disclosure, it may be helpful to consider background information on rechargeable lithium-ion batteries in general. Rechargeable lithium-ion batteries were developed in the 1970's, and many of their benefits and potential industrial uses were well understood even then. Although commercial adoption was initially slow, they became much more widely popular by the 1990's. They are principally characterized by reference to the type of intercalated lithium compound used as the cathodes in their battery cells. Lithium metal oxides have been the most successful, with lithium cobalt oxide (LCO, or $LiCoO_2$) being most popular for use in industry, although its use has not been without drawbacks, particularly with respect to thermal runaway and related safety concerns. Through the course of development, substantial improvements have been realized by doping of lithium cathode formulations with additional metals such as nickel, manganese, and aluminum. Various innovations have also involved core-shell particle cathodes, improved anodes, and the use of solid lithium polymer electrolytes, and still other innovations have led to smaller cathode particle sizes, increased electrode surface areas, and other improvements in overall battery capacity.

Today, the most popular lithium-ion batteries are of the LCO type, with lithium nickel cobalt aluminum oxide (NCA, or $LiNiCoAlO_2$) and lithium nickel manganese cobalt oxide (NMC, or $LiNiMnCoO_2$) being particularly popular. Other alternative cathode compositions have included other lithium metal oxides such as lithium manganese oxide (LMO) and lithium manganese nickel oxide (LMNO), and other lithium-ion chemistries can be considered for particular needs. Lithium metal phosphates, for instance, have also long been theoretically available for improved cycle counts, shelf life, and safety, although other performance trade-offs have made them less popular than LCO types amongst manufacturers. As one particular type of lithium metal phosphate, lithium iron phosphate (LFP, or $LiFePO_4$) batteries have long been known as an available type of rechargeable lithium-ion battery, with various pros and cons relative to NCA, NMC and other LCO batteries, which have generally weighed against use of LFP.

As a particular example of successful implementation of lithium-ion batteries in other fields, Tesla, Inc. has popularized the use of NCA batteries for its Model S electric cars. Their NCA batteries work well largely due to their high energy density, although they tend to have relatively low thermal stability, with a thermal runaway temperature of around 150° C. Tesla's battery manufacturing method helps balance the benefits and risks by safely interconnecting hundreds of smaller battery cells in a much larger assembly, in a way that enables the necessary energy density while minimizing the risk of arcing and overheating. Within the larger assembly, the hundreds of smaller battery cells are connected in groups, each group including a parallel arrangement of numerous cells connected by wire bonds to adjacent busbars. The busbars of those groups are then combined in series to produce a much larger assembly that meets the power demands for an electric car. The method permanently connects each terminal of each cell into the overall assembly, although rather than using traditional methods of soldering, resistive spot welding, or laser welding, Tesla uses ultrasonic vibration welding, and the wire bonds are made of low resistance wire that allows for expected currents to pass through without significant overheating. Each wire bond is only about a centimeter in length, with one end bonded to the battery terminal and the other end bonded to an aluminum busbar conductor, which in turn is electrically joined in a circuit with other busbars. In the event of overcurrent such as with a short circuit or the like, each wire bond can serve as a fuse that breaks to prevent excessive overheating.

Although LFP batteries tend to have lower energy densities than NCA and NMC batteries, they have also long been known to have greater thermal stability. Thermal runaway for LFP batteries typically does not occur until around 270° C., which improves safety and decreases the likelihood of catastrophic failure. LFP batteries are also more stable under short circuit or overcharge conditions and will not readily decompose at high temperatures. As other arguable advantages, LFP batteries also tend to have greater power density (i.e., they can source higher power levels per unit volume) as well as greatly increased cycle life in comparison to lead-acid batteries. While common lead-acid batteries have an average life of 300 cycles with 20% degradation of stored charge, LFP batteries can last over 2000 cycles with the same 20% degradation of stored charge.

Meanwhile in the field of the present invention, despite long availability of lithium-ion batteries in general, Class I forklifts are still typically powered by lead-acid batteries. One reason is that many forklifts, especially Class I forklifts, require a substantial counterbalance for safe use. While lead-acid forklift batteries commonly weigh more than a thousand pounds, many forklifts have therefore been designed to use the weight of lead-acid batteries to maintain stability. However, their massive weight also presents numerous challenges, particularly in the context of extracting, replacing and otherwise handling them. While personnel cannot safely lift anything near that heavy, special hoists and battery changing equipment are required, which in turn involves more expense and floor space, not to mention the risks of back injury and the like.

Beyond the weight-related risks, because of the corrosive nature of sulfuric acid, lead-acid batteries also present risks of damage to eyes, lungs, skin and clothing of personnel who work with them. Plus, hydrogen gas is commonly released during battery recharge, which can combine explosively with oxygen, as well as cause accelerated corrosion of surrounding components. Consequently, special safety protocols are needed with lead acid batteries, and special attention is needed to ensure adequate ventilation of hydrogen and sulfuric fumes around forklifts and their recharging stations.

Moreover, lead-acid forklift batteries are also expensive in terms of time, space and inventory. A lead-acid forklift battery can generally only be used continuously for around six hours before requiring 8-9 hours to recharge. They can also require extensive hours of maintenance and have a much shorter life cycle when compared to lithium-ion technologies. They also tend to require dedication of large areas in warehouses for charging and maintenance, and each forklift generally requires two spare batteries for a facility conducting 24-hour operations.

Additionally, new forklift battery design allows for other improvements to the existing systems beyond the improved performance and safety. Forklift batteries require a large amount of power to recharge in a timely manner, and existing chargers and charging cables are large as a result. The charging cables are not only thick and heavy, but the chargers are also expensive and inconvenient for users to operate. Existing designs can be improved upon by integrating a charging system within the battery that can be recharged by connecting an extension cord to the unit. An integrated design alleviates many of the issues existing chargers face in terms of size, expense, and ease of operation.

As a result of many of the above-mentioned and other reasons, others have long considered use of lithium-ion forklift batteries as an alternative, but any resulting attempts have been weak at best, and many of the challenges of the characteristically massive lead-acid forklift batteries still plague forklift-related industries.

Therefore, despite the well-known characteristics and long availability of rechargeable LFP and other lithium-ion battery technologies, there are still substantial and long-felt unresolved needs for battery technology improvements in the forklift industry. Commonly owned U.S. Provisional Patent Application 63/196,813 is incorporated herein by reference in its entirety.

SUMMARY OF THE INVENTION

The innovations of the present invention improve safe and reliable operations of conventional electric forklifts in various ways, in part by enabling rechargeable lithium-ion forklift batteries that are interchangeable with lead-acid forklift batteries for which such forklifts are conventionally adapted to be used. Many embodiments of the present invention involve rechargeable battery assemblies that are forklift-battery-sized but that comprise multiple battery modules.

The entire assembly can be recharged while it remains in the forklift. Moreover, due to other innovative aspects of Applicant's approach, the preferred embodiment of the assembly can be recharged easily by plugging in a 480 or 240 volt extension cord, compared to conventional methods of large and expensive charging systems that are cumbersome for individuals to operate. The integrated charger includes a switch that changes the configuration of the battery assemblies from parallel when in operation to a series configuration when charging. Battery modules of preferred embodiments are connected in a combination of series and parallel connections to achieve higher voltage, higher capacity, and/or higher ampacity.

Preferred embodiments of the larger battery assemblies include a housing that is forklift-battery-sized, together with a symmetrical arrangement of modules. Preferably, the housing contains eight battery modules installed vertically within the assembly, with their electrical and data connections occurring within the battery. The assembly requires a minimum number of battery modules for continuous operation based on voltage and current requirements of the application. Located between the battery cells and the printed circuit board (PCB) are plastic battery trays and an adhesive.

Each battery module has an integrated battery management system (BMS). The BMS monitors the health to include cell voltage, current, and temperature. The system monitors the state of charge, compensates for voltage differences, and ensures the battery assembly remains operational if and only if the battery cells are properly balanced and within the operating temperature limits. Additionally, the system can retain and communicate history and information to lift trucks and chargers through a physical CAN bus.

Each battery module is self-sufficient containing its own internal management system. However, there will be some redundant monitoring and control conducted by secondary controllers, e.g. motor controllers, Battery Operating System Supervisor (BOSS) Module and/or chargers.

Within each module, individual battery cells are connected using an approach that is comparable to the Tesla method of wire bonded battery manufacture. An important difference from Tesla, however, involves the use of LFP battery technologies rather than NCA or other LCO battery technologies, as previously discussed. An electrically insulative adhesive is used between the top plastic battery tray and the PCB. Additionally, the same adhesive is used between the battery cells and the top and bottom plastic battery trays. A thermal gap filler is applied between the bottom of the battery cells and the module enclosure for the purpose of thermal management.

BRIEF DESCRIPTIONS OF THE DRAWINGS

FIG. 1 shows an isometric view of a preferred embodiment of the disclosed assembly. Height H, Width W, and Depth D of the embodiment are shown for illustrative purposes. The assembly includes a housing containing eight separable battery modules.

FIG. 2 shows a side view of a Class II forklift in a configuration representative of the prior art, showing its inclusion of a conventional lead-acid forklift battery in an openable battery compartment with arrows conceptually illustrating the relationship between its counterweight, the weight of its load, and the resulting center of mass in comparison to the force of the opposing fulcrum created at the front wheels of the forklift.

DETAILED DESCRIPTIONS OF PREFERRED EMBODIMENTS

The following descriptions relate to presently preferred embodiments and are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more.

PREFERRED EMBODIMENTS

The following descriptions relate principally to preferred embodiments while a few alternative embodiments may also be referenced on occasion, although it should be understood that many other alternative embodiments would also fall within the scope of the invention. It should be appreciated by those of ordinary skill in the art that the techniques disclosed in these examples are thought to represent techniques that function well in the practice of various embodiments, and thus can be considered to constitute preferred modes for their practice. However, in light of the present disclosure, those of ordinary skill in the art should also appreciate that many changes can be made relative to the disclosed embodiments while still obtaining a comparable function or result without departing from the spirit and scope of the invention.

Main Housing and Battery Module Interface Design

Figure 1:
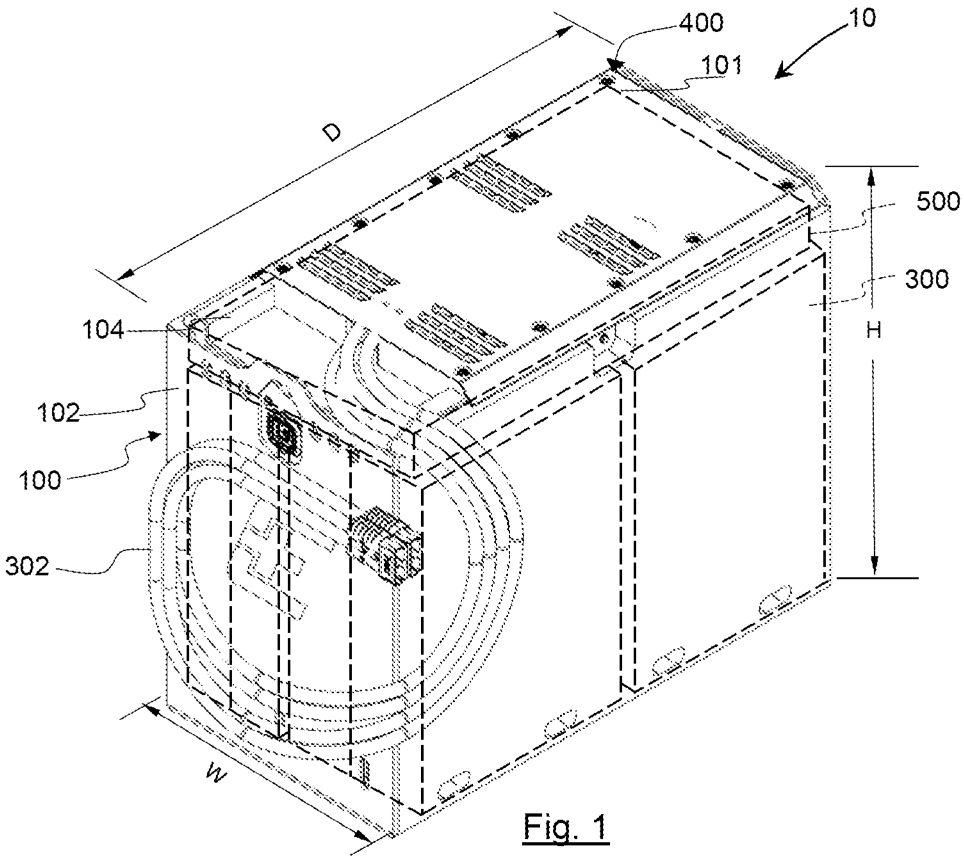

In FIG. 1, there is shown a perspective view of a battery module assembly 10, showing the main enclosure ("housing") 100 that includes main cover 101 and main battery enclosure 102. Housing 100 is preferably constructed of steel or another material suitable for providing strength and stability. Battery module assembly 10 has eight battery modules ("modules") 300 arranged vertically. When installed in housing 100, each module 300 is enclosed by the main cover 101 and front cover 104. A charger 500 (described in detail in FIG. 5) is attached to the modules 300, which is represented here with a box within housing 100. Those skilled in the art will recognize that the charger 500 represented in FIG. 1 is just for illustrative purposes and can be other dimensions or shapes. The main cover 101 is fastened to the housing 100 with screws 400. Power from the modules 300 are transmitted by the main power wire assembly 302.

Representative Lift Truck

Figure 2:
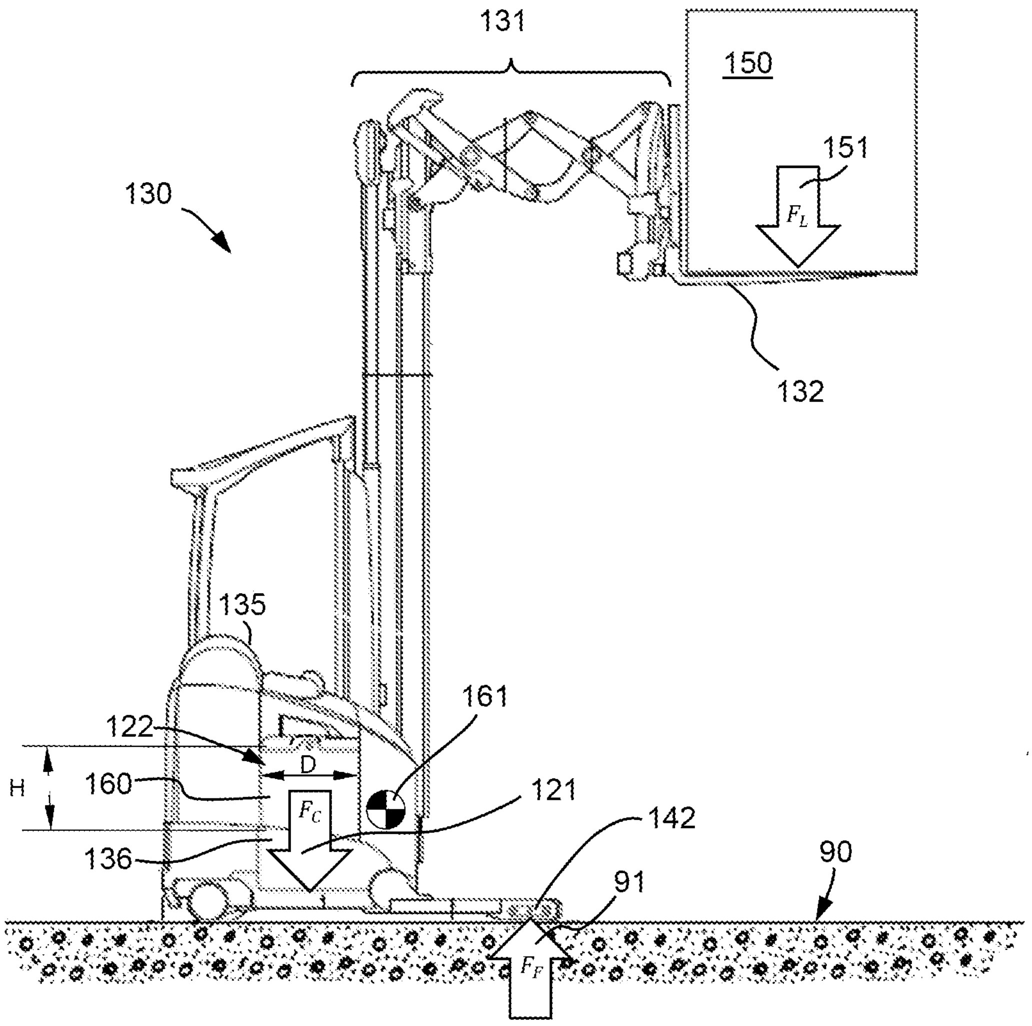

FIG. 2 shows a side view of a conventional Class II electric forklift 130, which is representative of a prior art lift truck design with which and in which the disclosed rechargeable battery module assembly 10 may be incorporated, embodied or used. It should be understood that the disclosed rechargeable battery module assembly 10 may also be incorporated into other classes of lift trucks, including Class I and Class III. The particular model of forklift 130 illustrated is most like a Crown RM6000 series forklift, which specifies a 48V battery that is 38.38 inches long (i.e., the lateral dimension when installed on the forklift)×20.75 inches wide (i.e., depth from front to rear)×31 inches in height and that meets minimum weight requirements. As a Class II forklift, forklift 130 is a mobile truck with a lifting assembly 131 for raising and lowering forks or other load supporting members 132 that are adapted to support a load 150 thereon, for the purpose of lifting, carrying or moving that load 150.

While the load supporting members 132 are conventionally designed to support the load 150 in a cantilevered fashion, extending forward of a fulcrum generally created by the front wheels 142 of the forklift 130, heavier loads present risks of tipping over the forklift 130. Hence, minimizing that risk of tipping under load is basic to safe operation of such a forklift 130 and, in line with its classification as a Class II lift truck, the full range of weight ($F_L$, illustrated by arrow 151) of the loads 150 to be carried by forklift 130 must be properly counterbalanced by a counterweight force ($F_C$, illustrated by arrow 121). In other words, for safe lifting and maneuvering of a load 150 without tipping, the forward-tipping torque created principally by the weight ($F_L$, illustrated by arrow 151) of that load 150 must be exceeded by the opposing torque created principally by the counterweight force 121 ($F_C$) of the forklift 130, particularly for loads at the heavier end of the range of manufacturer specified load capacities for forklift 130.

In the prior art, such a forklift 130 generally includes a large lead acid battery 160 as a major part of the counterweight force ($F_C$), and Class II forklifts are generally designed accordingly. The design of such forklifts generally incorporates structure to safely support the weight of the forklift battery 160 within a battery compartment 122 of a particular length (i.e., depth "D"), height "H", and width. It should be understood that, with respect to these dimensional characteristics shown in FIGS. 2 and 3, the width dimension is perpendicular to FIGS. 2 and 3.

The battery compartment 122 is generally defined in part by removable or openable panels or the like that partially or completely contain and define the space for the forklift battery 160 therein. In the case of the illustrated forklift 130, for instance, the battery compartment 122 is defined in part by a seat assembly 135 and a partial side panel 136. The seat assembly 135 normally sits over the top of the forklift battery 160 but has a releasable latch that allows it to be manually pivoted up and away from the forklift battery 160 to enable an operator to access the forklift battery 160 or its compartment 122. Analogously, panel 136 or other structures are provided to help enclose and define the battery compartment 122, and panel 136 may also be either removable or openable to enable more complete access to that battery compartment 122, such as for purposes of checking or replacing the forklift battery 160 therein. Forklift 130 also has positive and negative electrical conductors for removably connecting the forklift's electrical circuitry to the corresponding terminals of the conventional forklift battery 160.

The forklift uses a fulcrum ($F_F$, illustrated by arrow 91) which is created between the forklift's front wheels and the underlying floor 90. If the moment created by the load force ($F_L$) of load 150 forward of that fulcrum 91 exceeds the opposite moment of the forklift counterweight ($F_C$), the forklift 130 will tip forward, toward the load 150, resulting in a dangerous situation. The location of the center of gravity 161 depends partly on if the forklift is loaded or unloaded. When the forks 132 are raised while carrying a load 150, the center of gravity 161 naturally shifts toward the front of the forklift and upward.

Rechargeable Lithium-Ion Battery Assembly

Figure 3:
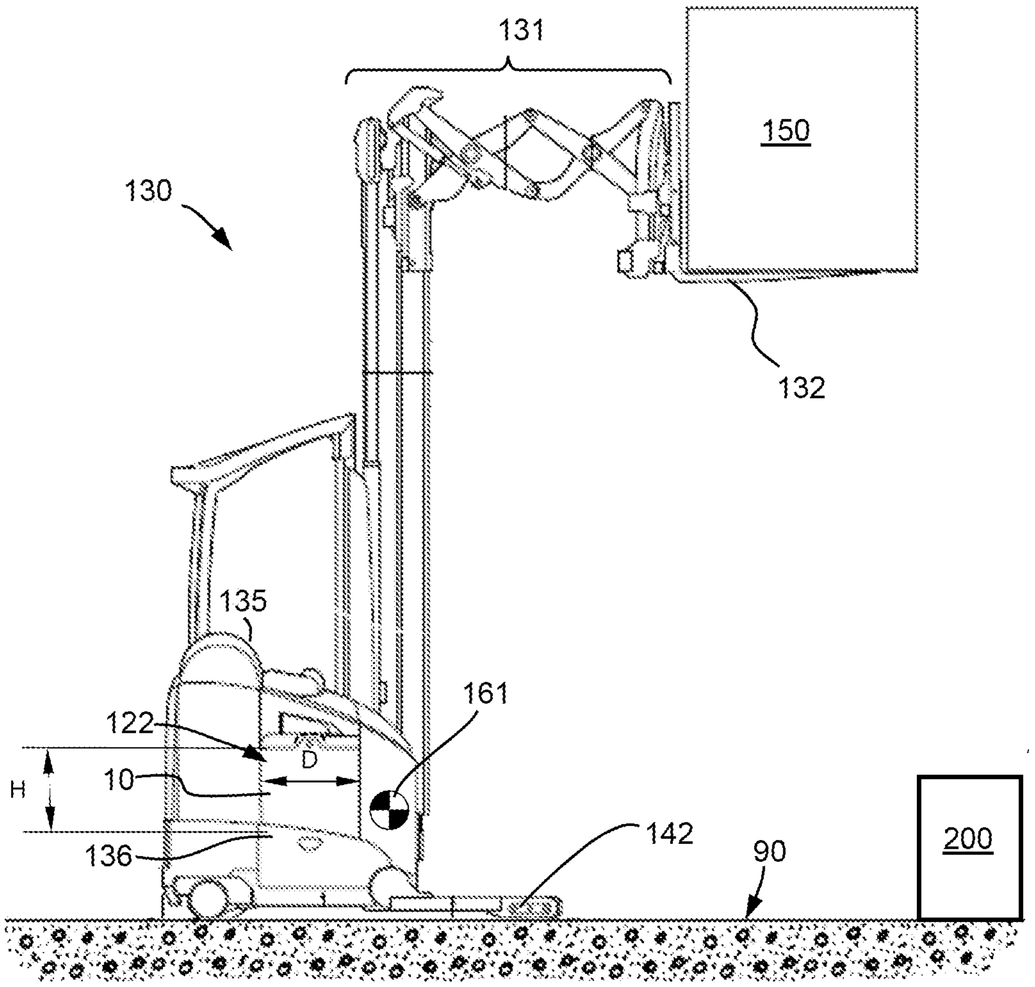
FIG. 3 is a side view of a Class II forklift without the conventional lead acid forklift battery of FIG. 2, instead incorporating a rechargeable battery assembly according to the teachings of the present invention.

FIG. 3 shows the same representative Class II electric forklift 130 as illustrated in FIG. 2 but having a preferred rechargeable battery assembly 10 according to the teachings of the present invention operatively installed in the battery compartment 122, in place of the conventional lead acid forklift battery 160 of FIG. 2. In contrast to the conventional lead-acid battery 160, rechargeable assembly 10 includes a plurality of separable battery modules 300 (8 in the illustrated embodiment), each of which includes numerous lightweight lithium-ion battery cells therein. Most preferably, those numerous battery cells are of the LFP type. The entire assembly 10 can hold an operable charge for around ten hours before requiring approximately 60 minutes to recharge, in contrast to the shorter usage durations and much longer charging durations that are characteristic of conventional lead acid battery 160. Also, due to their lithium-ion chemistry, each module 300 can be cycled through about six times as many charging cycles as conventional lead-acid battery 160. FIG. 3 also illustrates a battery power source 200 that, as will be described in greater detail below, is configured to be coupled with a power input of battery assembly 10 for charging battery modules 300. Due to capabilities of charger 500, power source 200 can be a standard source of power that is not made specifically for battery assembly 10. In some embodiments, power source 200 is a 240V or 480V power supply. Those with skill in the art will recognize that power source 200 can be rated for more or less than 480V without departing from the scope of this disclosure.

For LFP chemistries in particular, charge rates corresponding to one hour or less charge times are often within the recommended operating limits of the cell. The longer run times of rechargeable assembly 10 compared to conventional lead-acid batteries 160 also improves workplace efficiency. For lead-acid batteries 160, large areas are allocated for recharging. After an 8-hour work shift ends, lead-acid battery 160 is removed for recharging and another charged lead-acid battery 160 is inserted. Replacing this system with rechargeable assembly 10 can save time and valuable space in the work environment. The charging system allows for simple and less burdensome recharging by plugging in an extension cord directly into the battery module assembly 10.

Another important advantage of rechargeable assembly 10 is the lower equivalent series resistance (ESR) in LFP batteries than lead-acid batteries 160. Lead-acid batteries 160 experience decreased performance as a result of having higher ESR. Often as these batteries 160 discharge, a "voltage droop" occurs, causing sluggish operation of the forklift truck under load or acceleration. Most often, this occurs around 6 hours into a shift, requiring an additional recharge per shift, thereby reducing the life of the battery. LFP batteries provide an improvement in sustained performance during shifts while significantly reducing the risk of voltage droop.

Sized, weighted and otherwise adapted to be roughly comparable to the conventional battery 160, the height "H", depth "D", and width of assembly 10 are substantially the same as those for the conventional forklift battery 160 intended for use with forklift 130. Hence, assembly 10 may be described as "forklift-battery-sized". Due to its forklift-battery-sized characteristic, for the forklift 130 as illustrated, assembly 10 is able to safely fit in the same battery compartment 122 as conventional battery 160. The preferred embodiment of rechargeable battery assembly 10 is also weighted with centrally oriented steel plates in its base, integrally secured to its lower surface, to meet the minimum (and maximum) weight requirements of batteries to be used in forklift 130, as specified by the manufacturer of forklift 130.

Hence, for use on the Class II electric forklift 130 shown in FIG. 3, lithium-ion battery assembly 10 is adapted to fit in a Crown RM6000 forklift battery compartment 122, for use as a replacement of conventional lead-acid battery 160. More specifically, for the RM6000, lithium-ion battery assembly 10 roughly fits the dimensions of 38.38 inches long (i.e., the lateral dimension when installed on the forklift)×20.75 inches wide (i.e., depth from front to rear)×31 inches in height and that meets minimum weight requirements, and assembly 10 has a minimum weight of 2600 pounds, preferably with a margin of fifty pounds over the manufacturer's specified minimum battery weight requirement.

Those of skill in the art will understand that the dimensions, fit, shape and weight for different makes and models of forklifts will dictate a range of dimensions for alternative embodiments that are intended to be used with any particular make and model of forklift. The full range of sizes for Class I & III forklift batteries are intended for alternative embodiments. The range of minimum battery weight requirements for Class I & III electric forklifts are approximately 1,500 to 4,000 lbs., which is also intended for alternative embodiments.

Although many aspects of the present invention can be appreciated with other types of rechargeable batteries, preferred embodiments use battery cells of one of the lithium-ion types. Most preferably, each module 300 of the battery assembly 10 incorporates hundreds of self-contained battery cells of the LFP (lithium iron phosphate) type. Although all lithium-ion battery types can experience thermal runaway, LFP battery cells of the preferred embodiment have a fairly high thermal runaway temperature, of 270° C., substantially higher than the runaway temperature for NCA or other LCO cells, which are the more conventional of lithium-ion battery cells, which typically have a thermal runaway temperature of around 150° C. Although the preferred embodiment uses LFP batteries, it should be understood that some aspects of the invention can be appreciated through use of other types of rechargeable lithium-ion battery cells. For example, alternative compounds for some aspects of the lithium-ion rechargeable battery assembly 10 are contemplated to include, without limitation, lithium cobalt oxide ($LiCoO_2$), lithium manganese oxide ($LiMn_2O_4$, $Li_2MnO_3$), lithium nickel cobalt aluminum oxide ($LiNiCoAlO_2$), and lithium nickel manganese cobalt oxide ($LiNiMnCoO_2$).

Within each of the battery modules 300 of the preferred embodiment, a plurality of self-contained battery cells (preferably three hundred, seventy-two cells per module 300) is connected in a combination of series and parallel using a wire bonding method. The wire bonding method connects batteries using wire bonds instead of busbars. The wire bonding is achieved through ultrasonic friction welding. By interconnecting batteries with wire bonding, the wire bonds can prevent short circuits while acting as fuses. The wire bonds are made of Aluminum-Nickel alloy wire that allows for the expected current to pass through without significant overheating and allows the wire bond to break to prevent over-currents of individual cells. Additionally, Field Effect Transistors ("FETs") or other forms of conventional fuses are placed inside battery modules. If the current carrying capacity is exceeded, the fuse will open and prevent the overcurrent from also blowing out the wire bonds. Alternative embodiments of this design may connect battery cells in parallel. Additionally, alternative methods of connecting batteries could include traditional soldering and spot welding.

Figure 4:
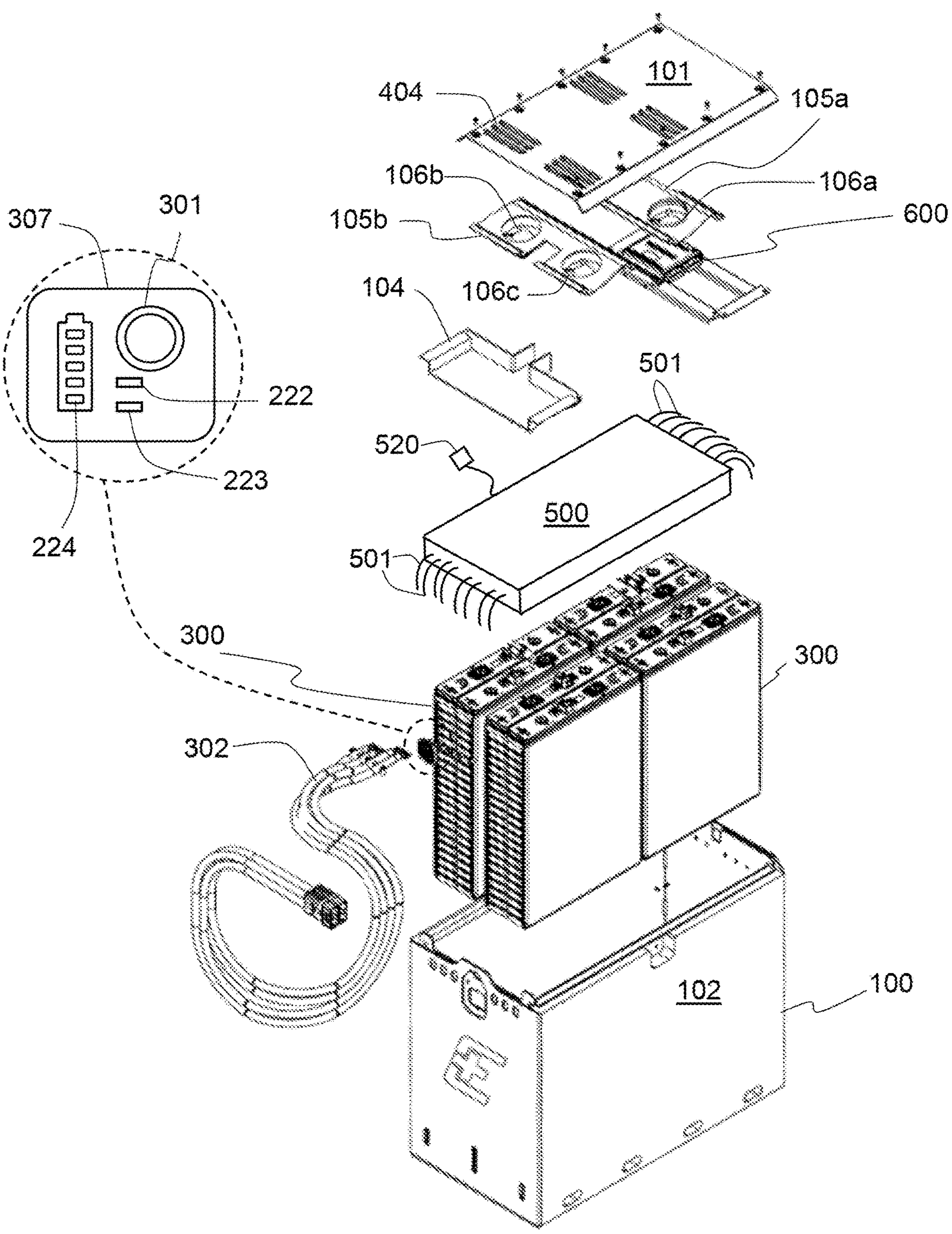
FIG. 4 shows an exploded view of the battery assembly.

Turning to FIG. 4, there is shown an exploded view of a preferred complete battery assembly 10. Preferred embodiments of rechargeable assembly 10 have eight battery modules 300 installed in a larger housing 100. The complete assembly 10 preferably contains four sets of two modules 300 arranged two-by-two and vertically oriented within housing 100. Alternative embodiments may have a different location or different quantities of battery modules within the housing 100. The modules 300 can be inserted and removed from the main housing 100. The main housing 100 is assembled by tightening of screws 400 that will attach the front cover 104 to the main cover 101.

Shown below the main cover 101 of housing 100 are fan assemblies 105*a* and 105*b* and BOSS Module 600. Preferably, direct current (DC) brushless fans 106 are used to cool the modules 300. The fans 106 are positioned so that one fan provides cooling for one pair of modules 300. For example, the first fan 106*a*, shown immediately below main cover 101, is located above the first and second modules 300. The second fan, which cannot be seen but is located next to fan 106*a* on fan mount 105*a*, is located above the third and fourth modules 300, the third fan 106*b* above the fifth and sixth modules 300, and the fourth fan 106*c* above the seventh and eighth modules 300. Vents 404 on the main cover 101 allow airflow into and out of the interior of the battery module assembly 10. The fan mounts 105*a*, 105*b* rest between the main cover 101 and charger assembly 500. Different numbers of fans are also contemplated by the inventor for the purpose of providing module cooling.

A button pad 301 is configured and adapted to display diagnostics for the battery module assembly 10. A user can press button pad 301 to "wake" the display 307 from sleep mode. A coded push can be used for diagnostics. There is a status bar 222 that indicates the present status of the battery module assembly 10. If the fault bar 223 lights up red, this indicates that there is a fault with at least one module 300. There are five bars 224 that light up green, using light emitting diodes (LEDs) and indicate the battery charge level of module 300. The five bars 224 will show charge status in increments of approximately 20% of charge ranging from 0% to 100% based on the number of LEDs illuminated. For example, one bar indicates that the charge is very low (around 20%) and five bars indicates the battery module assembly 10 is fully charged (100%). State of charge is determined, at least in part, on measuring the current output of each operating battery module 300 using a current sensor. The overall state of charge for battery module assembly 10 reflects the average current output of all of the presently operating battery modules 300. Display 307 also has a fault indicator which is lit when one or more battery modules 300 experiences a fault condition. One or more battery modules that are in a present fault condition can be shut off such that those one or more battery modules are no longer operating and do not generate power. Any battery module 300 that is not presently operating is not used to determine the overall state of charge for the battery module assembly 10.

Battery assembly 10 is designed to be interchangeable and replaceable with various forklifts 130. That is to say, battery assembly 10 can be removed from one forklift 130, for any of a number of reasons such as maintenance, repair, charging, cleaning, etc., and put back into the same or another forklift 130 for operation of the forklift 130. Accordingly, battery assembly 10, and all of the components therein, can be described as an interchangeable, replaceable, or portable battery assembly 10, as battery assembly 10 is replaceable or portable relative to the forklift 130.

Charger Module

A charger module 500 with a switch 510 is attached to the top side of the battery modules 300 and is described in detail below. Other aspects of charger module 500 will be understood by those of skill in the art, particularly from descriptions of preferred and alternative embodiments also described with reference to FIGS. 5A, 5B, 7A, 7B, 8A-8C, and 11.

Figure 5A:
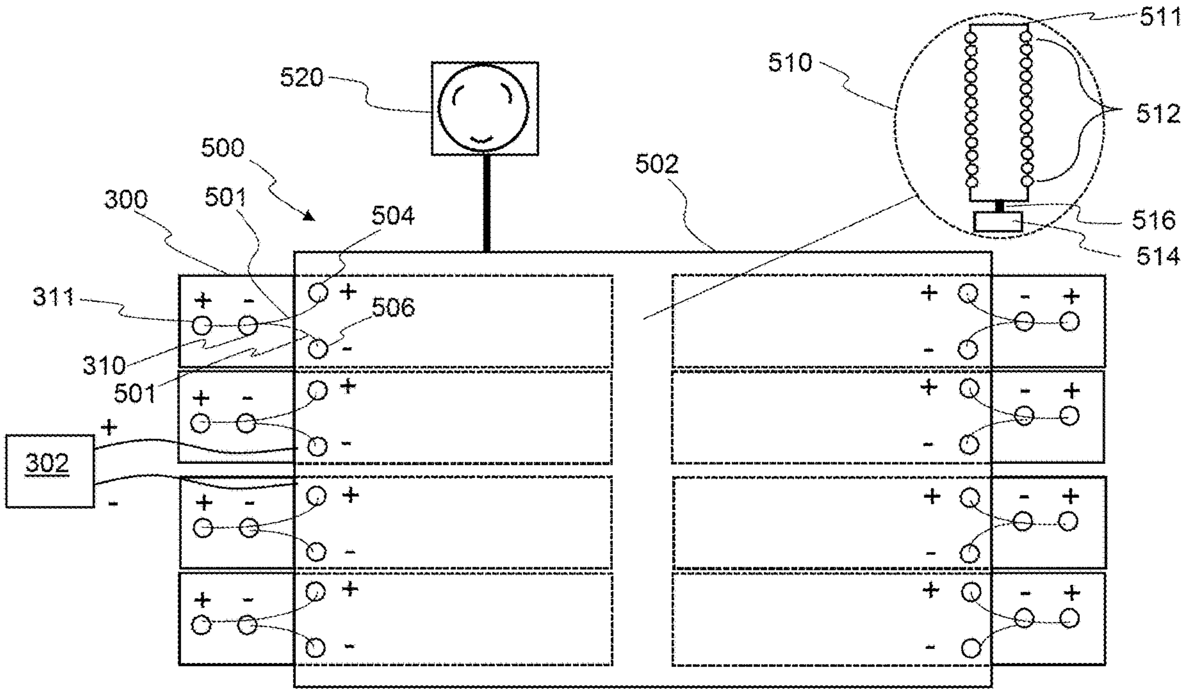
FIG. 5A illustrates a top-down view of a diagram of the battery assembly with a charger attached.

FIG. 5A illustrates a top-down view of a diagram of a preferred embodiment of charger 500 attached to modules 300. The charger's 500 charger body 502 is attached directly to the battery modules 300 by connecting to the respective mating points. Portions of battery modules 300 that cannot be seen from the top view due to being covered by charger 500 are depicted using dashed lines.

Within the charger 500, there is a switch 510 with a rotatable contact arm 511 rotatable by a stepper motor 514, and lead screw 516. The contact arm 511 has a plurality of switch contacts 512. In preferred embodiments, contact arm 511 has twenty-four switch contacts 512. The switch 510 allows the battery modules 300 to be dynamically configured from a parallel connection to a higher voltage series connection, depending on if the forklift is in operation, during which the battery modules 300 are discharging, or if the forklift 130 is connected to an external power source 200 for recharging of the battery modules 300. Included in the charger is a 480-volt three phase receptacle 520 with twist lock for attaching a 480-volt extension cord of power source 200 for charging. Receptacle 520 is configured to be accessible from an outside of housing 100 such that housing 100 does not need to be disassembled in order to access receptacle 520 and charge modules 300 with power source 200. A connector 302 attaches the assembly to the forklift for supply power stored by battery modules to forklift 130 for operation. Although illustrated with a rotatable switch 510, those of skill in the art will understand that other types of switch arrangements would also fall within the scope of many aspects of the present invention. For example, switch 510 could be configured as a linearly slidable switch, and some aspects of the invention may be appreciated by an array of numerous switches, the operation of which would preferably be coordinated by a controller.

Referring again to FIG. 5A, the illustrated embodiment of charger 500 includes eight positive battery contact points 504, each configured to be electrically coupled with one of the battery module positive terminals 311 by wires 501 and eight negative battery contact points 506, each configured to be electrically coupled with one of the battery module negative terminals 310 by wires 501. In some embodiments, each battery contacts 504, 506 is in direct contact with its respective terminal 310, 311. However, one with skill in the art will understand that each contact battery 504, 506 can be electrically coupled to its respective terminal 310, 311 by electrically conductive intermediate members, such as by wires or other electrically conductive materials.

As will be discussed in greater detail below, each battery contacts 504, 506 is configured to be electrically coupled with one of the plurality of switch contacts 512. Further, switch 510 is electrically coupled with both receptacle 520 and connector 302. Motor 514 can turn contact arm 511 to an operation position where switch contacts 512 are positioned to be coupled to contacts 504, 506 in such a way that connector 302 can deliver power stored by modules 300 to forklift 130 for operation. Motor 514 can turn contact arm 511 to a charging position where switch contacts 512 are positioned to be coupled to contacts 504, 506 in such a way that a plug of power source 200 plugged into receptacle 520 can charge modules 300. Accordingly, contacts 512 are interconnected with each other and battery assembly bus bars 522, 524 (shown in FIGS. 7A-7B) such that power can delivered to battery modules 300 when arm 511 is in the charging position, and such that power may be drawn from modules 300 for forklift 130 operation when arm 511 is in the operation position.

Figure 5B:
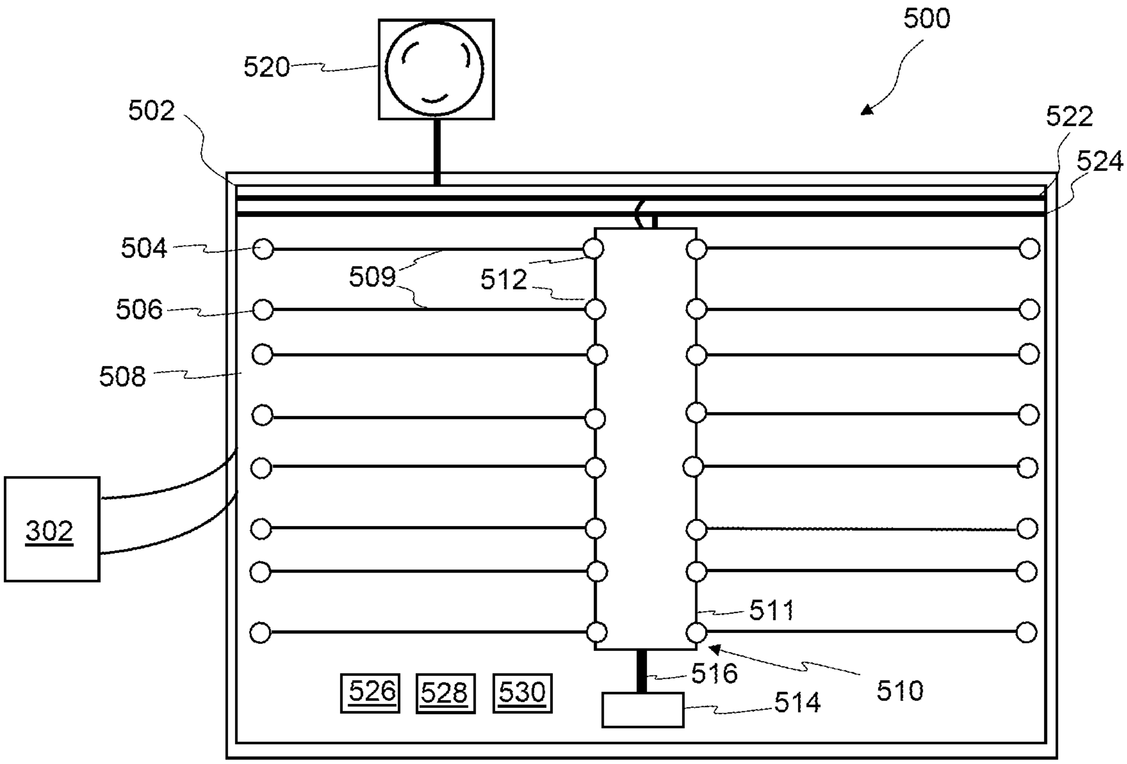
FIG. 5B illustrates a top view of the charger of FIG. 5A with a top of the charger removed to expose an interior of the charger.

FIG. 5B illustrates a top view of charger 500 with a cover of body 502 removed to expose the interior of charger 500. In some embodiments, charger 500 includes a printed circuit board (PCB) 508 on which contacts 504, 506 are disposed. As previously discussed, charger also includes switch 510. As illustrated, in some embodiments, electrically conductive layers 509 of PCB 508 electrically couple contacts 504, 506 with contacts 512 of charger switch 510. However, those with skill in the art will recognize that various means of electrical coupling may be employed to couple contacts 504, 506 with switch contacts 512 other than electrically conductive layers 509, such as by wires or other electrically conductive material. Switch arm 511 is also electrically coupled with assembly positive busbar 522 and assembly negative busbar 524. Charging receptacle 520 and connector 302 are coupled with PCB 508 and are electrically coupled with busbars 522, 524. Thus, charging receptacle 520 and connector 302 are electrically coupled with each of the plurality of battery modules 300 due to being coupled with busbars 522, 524, which are coupled with modules 300 through their connection to switch 510. Controller 530 includes various components for controlling charging and discharging operations of charger 500, such as memory for storing programs for operating charger 500 and a processor for executing the programs stored on the memory. Controller is electrically coupled with at least motor 514, voltage monitor 526 and voltage/current regulator 528. Controller is configured to control operation of motor 514 and voltage/current regulator 528. As will be discussed in greater detail below, controller 530 is configured to control motor 514 to rotate arm 511 to a charging position for charging of battery modules 300 and to an operation position for discharging of battery modules 300. As will be discussed in greater detail below, controller 530 is configured to control the voltage of electrical energy supplied to battery modules 300 based on voltage level readings received from voltage monitor 526.

Those with skill in the art will understand that FIG. 5B illustrates select electrical connections enabled by PCB 508, such as the connections between contacts 504, 506 and switch contacts 512, and between busbars 522, 524 and switch arm 511. Those with skill in the art will recognize that other electrical connections described are enabled through PCB 508. In some embodiments, busbars 522, 524 are different electrically conductive layers of PCB 508. In other embodiment, busbars 522, 524 are traditional busbars separate from PCB 508 but still electrically coupled with PCB 508 as has been, and will continue to be, described. Additionally, in some embodiments, busbars 522, 524 are outside of charger 500, such as, for example, between modules 300*a*-300*h* and charger module 500. Further those with skill in the art will understand that in some embodiments, charger 500 does not include a PCB and the various components of PCB 508 described are electrically coupled through various other means of electrical coupling, such as, for example, by wired connections or ribbons.

PCB 508 also includes a voltage monitor 526, a voltage/current regulator 528, and a charger assembly controller 530. Voltage monitor 526 is electrically coupled with each of the plurality of battery modules 300 by contacts 504, 506 and is configured to take voltage level readings of each of the battery modules 300. Voltage/current regulator 528 is electrically coupled, through PCB 508, with contacts 504, 506, switch 510, and/or busbars 522, 524 and is configured to regulate a voltage level of electrical energy supplied to modules 300 from power source 200 coupled with charging receptacle 520. Voltage/current regulator 528 is configured to further regulate the current level of electrical energy supplied to modules 300. Thus, as will be discussed in greater detail below, in some scenarios regulator 528 is configured to deliver electrical energy to modules 300 at a constant voltage value and in some scenarios regulator 528 is configured to deliver electrical energy to modules 300 at a constant current value.

In some embodiments, charger module 500 is configured to enable a 1C charging rate of modules 300*a*-300*h*. That is to say, charger module 500 is configured to deliver electrical power from power source 200 to the lithium-ion battery cells

324 of the modules 300*a*-300*h* at a charging current that will allow for the battery cells 324 to charge from a 0% charge level to a 100% charge level in one hour. Accordingly, charger module 500 can be referred to as a 1C charger.

Design of Battery Module and Battery Cell Network

Figure 6A:
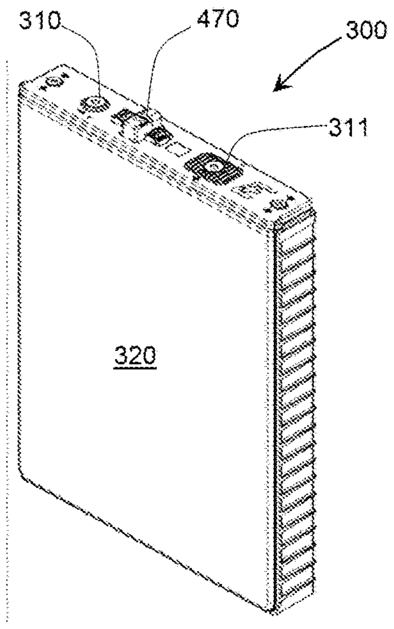
FIG. 6A shows a perspective view of one battery module.

Turning now to FIG. 6A, there is shown an isolated view of module 300. On a top surface of each module 300, the 6-pin signal connector 470 and positive bus terminal 311 and negative bus terminal 310 are mounted and accessible. The protective enclosure base 320 and module cover 321 of battery module 300 are preferably constructed of aluminum to dissipate heat.

Figure 6B:
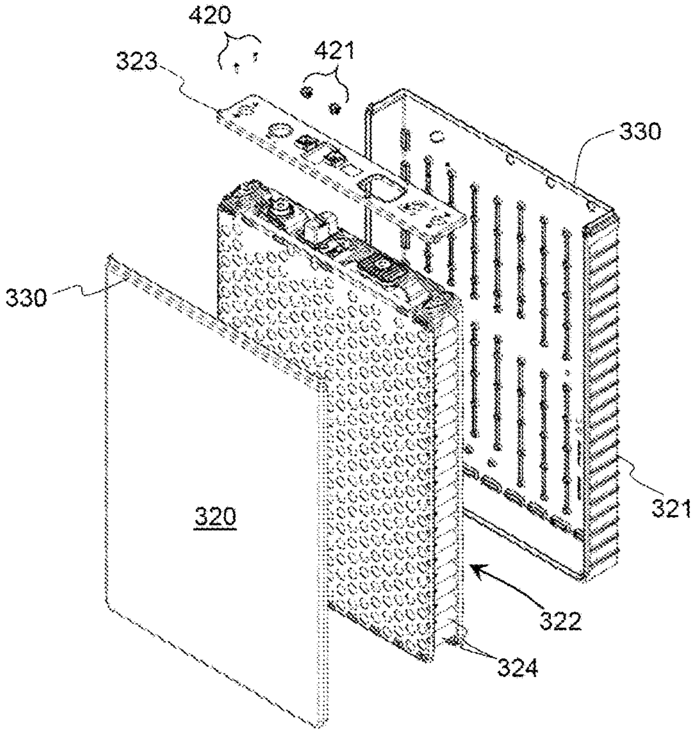
FIG. 6B shows an exploded view of one battery module.

Turning to FIG. 6B, there is shown an exploded view of the battery module 300 subassembly. The cell array 322 is protected by enclosure base 320 and the module cover 321. An endcap 323 is fastened to the cell array 322 with four screws 420. The enclosure base 320 and module cover 321 are positioned with locater tabs 330 along the top edges to fit inside the endcap 323. An adhesive 728 is applied as required to inner edges of the enclosure base 320. In preferred embodiments, the adhesive is an acrylic adhesive, but the use of other types of adhesives or sealants is contemplated. A sealant is applied as required to the module cover 321 and the endcap 323 for the purpose of sealing the interface between module cover 321 and endcap 323. In preferred embodiments, the sealant may be a silicone-based sealant, but use of other sealants with similar properties is contemplated. A thermally conductive gap filler 726 is applied as required between the cell array 322 and the endcap 323. The gap filling material 726 allows heat to be transferred from the battery cells to the enclosure 320 so it can dissipate from the module 300. Each of these compounds is electrically insulative. Cell array 322 is comprised of a plurality of lithium-ion battery cells 324 that are interconnected to provide electrical potential between the terminals 310, 311. Although many aspects of the present invention can be appreciated with other types of rechargeable battery cells 324, preferred embodiments use battery cells 324 of one of the lithium-ion types. Most preferably, each module 300 of the battery assembly 10 incorporates self-contained battery cells 324 of the LFP type. Although all lithium-ion battery types can experience thermal runaway, LFP battery cells of the preferred embodiment have a fairly high thermal runaway temperature, of 270° C., substantially higher than the runaway temperature for NCA or other LCO cells, which are the more conventional of lithium-ion battery cells, which typically have a thermal runaway temperature of around 150° C. Although the preferred embodiment uses LFP batteries, it should be understood that some aspects of the invention can be appreciated through use of other types of rechargeable lithium-ion battery cells. For example, alternative compounds for some aspects of the lithium-ion rechargeable battery assembly 10 are contemplated to include, without limitation, lithium cobalt oxide ($LiCoO_2$), lithium manganese oxide ($LiMn_2O_4$, $Li_2MnO_3$), lithium nickel cobalt aluminum oxide ($LiNiCoAlO_2$), and lithium nickel manganese cobalt oxide ($LiNiMnCoO_2$).

Figure 9:
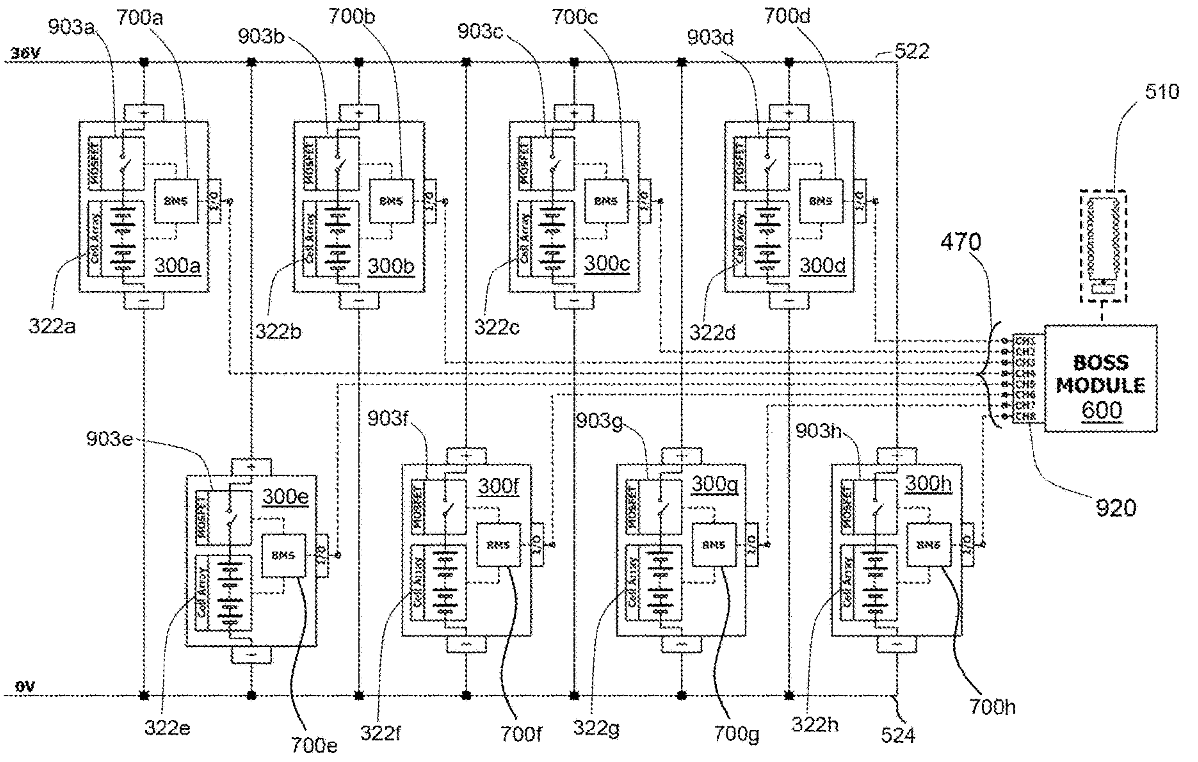
FIG. 9 shows a schematic diagram example of an embodiment of the operation configuration where eight battery modules are connected in parallel to the Battery Operating System Supervisor (BOSS) Module.
Figure 10:
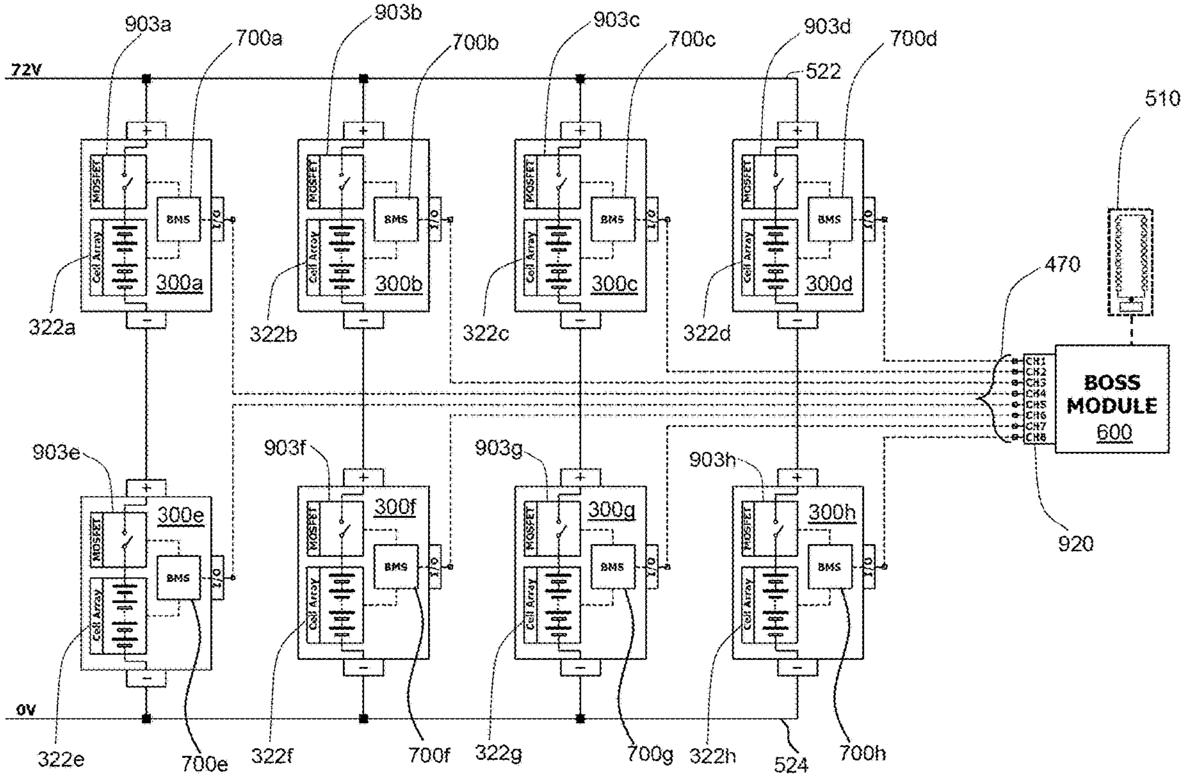
FIG. 10 is a schematic diagram example of an embodiment of a configuration with the battery modules in the housing connected in series/parallel.

Each module 300 has an integrated battery management system (BMS) 700 (as shown in FIGS. 9 & 10). The BMS 700 monitors the health of the module 300 to include cell voltage, current, and temperature. Each module 300 is composed of a plurality of battery cells 710 connected in series and parallel via wire bonding and ultimately terminating into an integrated BMS 700. The wire bonding will be completed using a method similar to the Tesla ultrasonic friction welding method. The wires of battery cells 710 pass through bonding holes of a battery module printed circuit board (PCB) and are bonded to both the PCB and the battery cell 710. The PCB is then used to directly transfer the electric current through the interior of the battery module 300. The use of the PCB prevents the entire battery module 300 from failing if one battery cell 710 malfunctions because the other cells are still connected to the plate.

Charger Module Operations

Figure 7A:
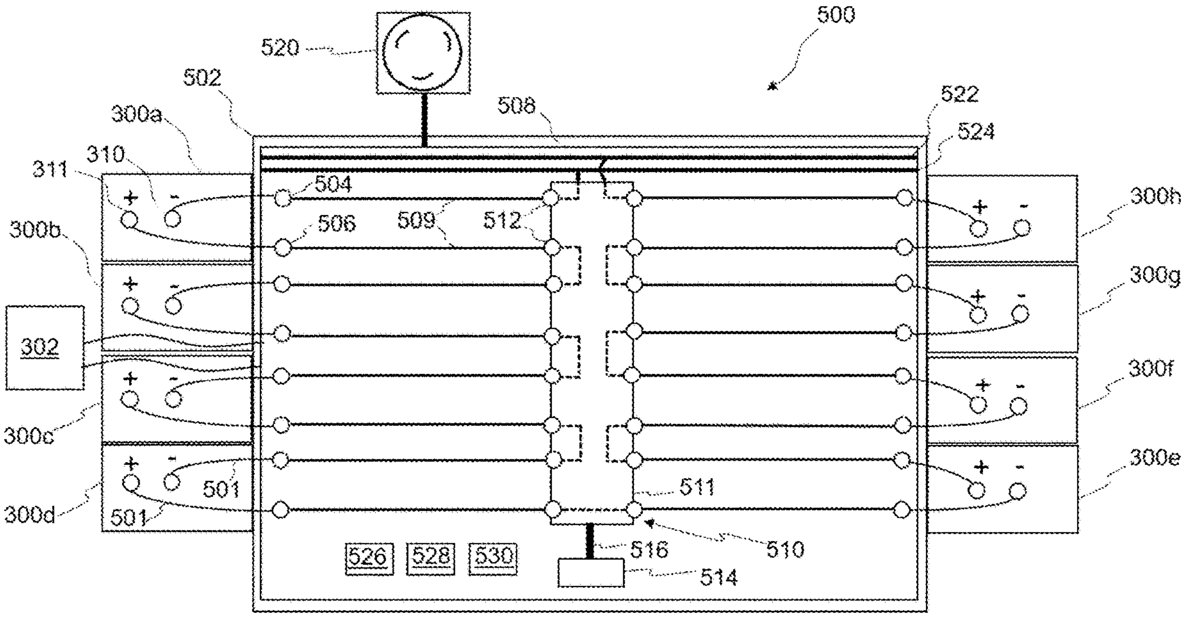
FIGS. 7A-7B are diagrams of different configurations achieved by the battery modules as controlled by a switch of the charger.

FIG. 7A is a diagram of a preferred embodiment of a series configuration of the battery modules 300*a-h* resulting in a voltage of 288V. The FIG. 7A configuration can also be referred to as the charging position, previously discussed. This configuration is optimal for charging the battery modules 300*a-h* as described in detail above. The switch 510 in the charger 500 achieves this configuration by rotating to different connections between the positive bus bar 522 and the 0 V (ground) bus bar 524.

In the charging position, the contact arm 511 is rotated by motor 514 such that the switch contacts 512 couple with battery contacts 504, 506 to electrically couple battery modules 300*a*-300*h* in series with bus bars 522, 524. The dotted lines are used to illustrate conductive layers of arm 511 used electrically couple various contacts 512. In some embodiment, the contacts are electrically coupled with conductive layers of arm 512, with wires, or any other known electrical conductor. As illustrated, in the charging position, arm 511 is positioned such that negative terminal 310 of module 300*a* is electrically coupled with a contact 512 that couples negative terminal 310 of module 300*a* to ground busbar 524. Arm 511 is positioned such that positive terminal 311 of module 300*a* is coupled to a switch contact 512 that electrically couples positive terminal 311 of module 300*a* with negative terminal 310 of module 300*b*. Similarly, arm 511 is positioned such that module 300*b* is connected to in series to module 300*c*, and so on. Finally, arm 511 is positioned such that positive terminal 311 of module 300*h* is coupled to a contact 512 that couples positive terminal 311 of module 300*h* to positive bus bar 522. Accordingly, modules 300*a*-300*h* are connected in series with assembly bus bars 522, 524 when arm 511 is positioned in the charging position. Bus bars 522, 524 are electrically coupled with receptacle 520 to deliver power from a charging source to modules 300 when switch 510 is in the charging position.

The series configuration described is beneficial for charging operations, because it allows for efficient power transfer from a charging source to modules 300*a*-300*h* while keeping current values low. In preferred embodiments, each battery module 300*a*-300*h* is a 36V battery module. When the eight modules 300*a*-300*h* are connected in series to power source 200 charging the modules 300*a*-300*h* at 36 kilowatts, charging the eight modules 300*a*-300*h* in an hour can be accomplished with only 125 amps of current. Comparatively, if the eight battery modules 300*a*-300*h* are connected to each other in parallel (which is how the modules 300*a*-300*h* are preferably connected in operation, as discussed further below), it would require 1000 amps of current to charge the modules in an hour with the same charging source. Accordingly, by charging the modules 300*a-h* in series, an operator can charge modules 300*a*-300*h* faster than if they were in parallel. Additionally, an operator may use charging equipment, such as power source 200, suitable for lower current systems.

Figure 7B:
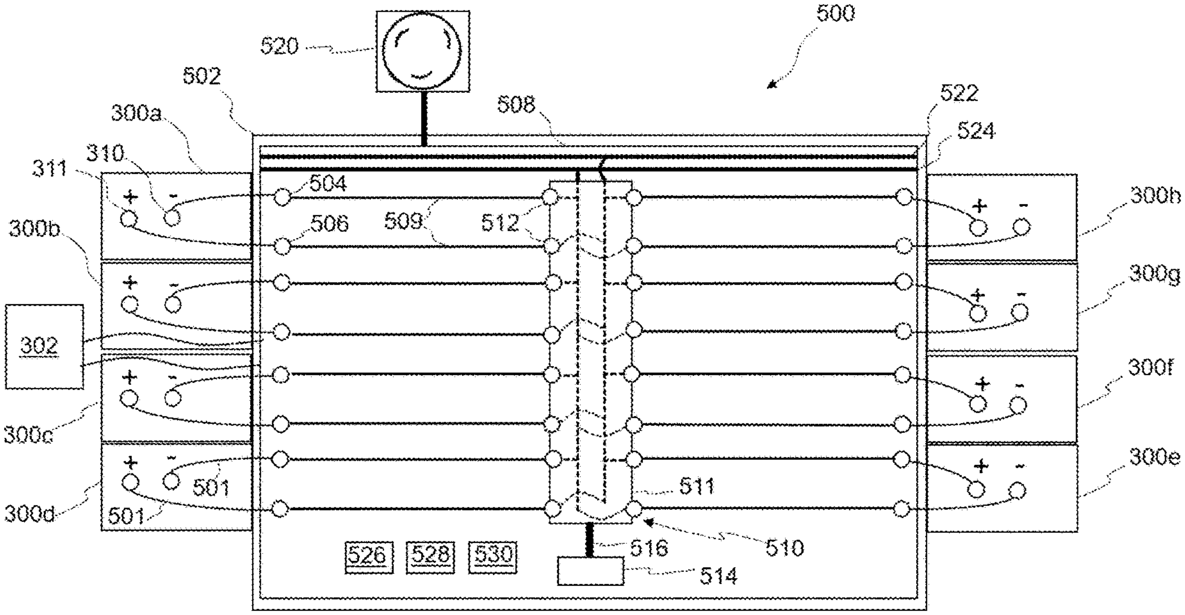

Shown in FIG. 7B is a diagram of a preferred embodiment of a parallel configuration of the battery modules 300*a-h* resulting in a voltage of 36V. The FIG. 7B configuration can also be referred to as the operation position, previously discussed. This configuration is optimal for discharging the battery modules 300*a-h* as described in detail above. The switch 510 in the charger 500 achieves this configuration by rotating to different connections between the positive busbar 522 and the 0 V (ground) busbar 524.

In the operation position, the contact arm 511 is rotated by motor 514 such that the switch contacts 512 couple with battery contacts 504, 506 to electrically couple battery modules 300 in parallel with bus bars 522, 524. As illustrated, in the charging position, arm 511 is positioned such that the negative terminal 310 of each module 300*a*-300*h* is electrically coupled to a switch contact 512 that electrically couples the negative terminal 310 with ground busbar 524. Similarly, arm 511 is positioned such that the positive terminal 311 of each module 300*a*-300*h* is electrically coupled to a switch contact 512 that electrically couples the positive terminal 311 with positive busbar 522. Busbars 522, 524 are electrically coupled with connector 302 to deliver power to forklift 130 for operation when switch 510 is in operation position. In the parallel configuration described, the modules 300*a*-300*h* are configured to supply a constant 36V to the forklift 130 for operation.

As previously discussed, according to various embodiments of the disclosure, controller 530 is electrically coupled with motor 514 and is configured to control the motor 514 to rotate arm 511 between the charging and operation positions. For example, in some embodiments, in response to detecting that power source 200 is coupled with receptacle 520 for charging of battery module 300*a*-300*h*, controller 530 is configured to command motor 514 to rotate arm 511 to the charging position illustrated in FIG. 7A. In some embodiments, in response to detecting that the power source 200 is unplugged from receptacle 520 or that the forklift 130 is otherwise engaged for operation, controller 530 is configured to command motor 514 to rotate the operation position illustrated in FIG. 7B.

Figure 8A:
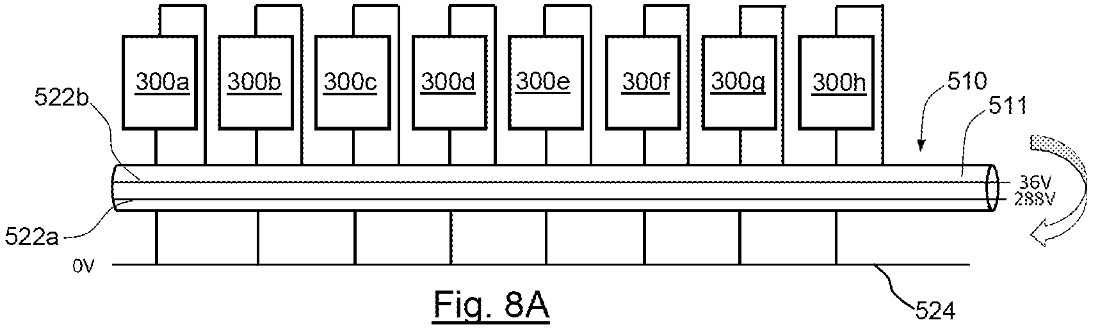
FIGS. 8A-8C are diagrams of different configurations achieved by the battery modules as controlled by a switch of the charger according to a different representation.
Figure 8B:
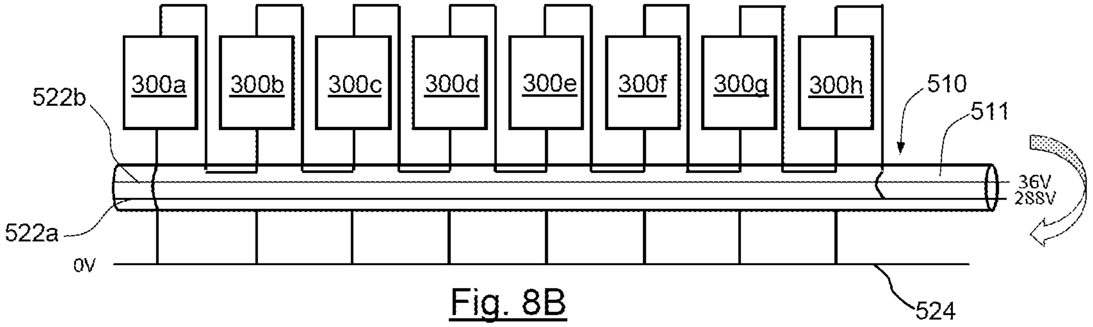
Figure 8C:
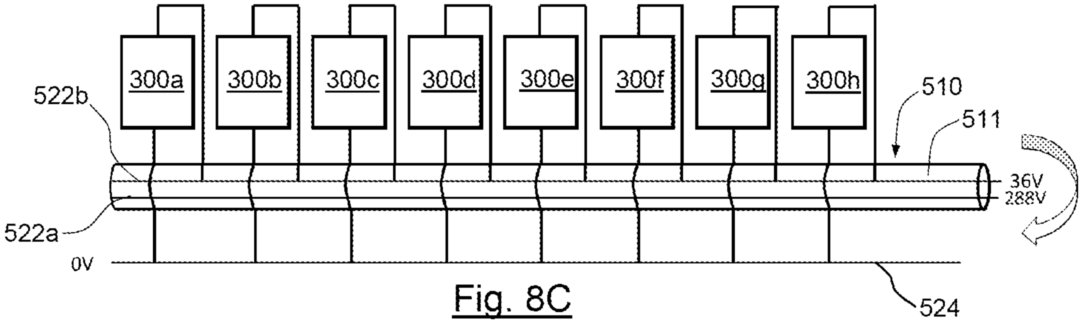

FIGS. 8A-8C provide an alternative illustration of the operation of switch 510 and the series and parallel configurations enabled by switch 510 according to a different representation. FIG. 8A is illustrative of both FIGS. 8B and 8C without showing the particular electrical connections within arm 511. As illustrated, arm 511 is electrically connected to each of battery modules 300*a*-300*h*, which are each nominally 36V modules in the illustrated embodiment. Arm 511 is also connected to a neutral busbar 524, designated at 0V, as well as two positive busbars 522*a* and 522*b*, designated at 288V and 36V, respectively.

FIG. 8B illustrates the charging position illustrated in FIG. 7A. As illustrated, in the charging position, arm 511 is positioned such that negative terminal 310 of module 300*a* is electrically coupled with a contact 512 that couples negative terminal 310 of module 300*a* to ground busbar 524. Arm 511 is positioned such that positive terminal 311 of module 300*a* is coupled to a switch contact 512 that electrically couples positive terminal 311 of module 300*a* with negative terminal 310 of module 300*b*. Similarly, arm 511 is positioned such that module 300*b* is connected to in series to module 300*c*, and so on. Finally, arm 511 is positioned such that positive terminal 311 of module 300*h* is coupled to a contact 512 that couples positive terminal 311 of module 300*h* to series positive bus bar 522*a*. Accordingly, modules 300*a*-300*h* are connected in series with assembly bus bars 522, 524 when arm 511 is positioned in the charging position.

FIG. 8C illustrates the operation position illustrated in FIG. 7B. In the operation position, the contact arm 511 is rotated by motor 514 such that the switch contacts 512 couple with battery contacts 504, 506 to electrically couple battery modules 300 in parallel with parallel bus bar 522*b* and ground bus bar 524. As illustrated, in the operation position, arm 511 is positioned such that the negative terminal 310 of each module 300*a*-300*h* is electrically coupled to a switch contact 512 that electrically couples the negative terminal 310 with ground busbar 524. Similarly, arm 511 is positioned such that the positive terminal 311 of each module 300*a*-300*h* is electrically coupled to a switch contact 512 that electrically couples the positive terminal 311 with positive busbar 522.

Those of skill in the art should also recognize that numerous alternative voltage configuration could be arranged to utilize aspects of the present invention. For instance, rather than switch all modules 300*a*-300*h* of a particular embodiment into a series configuration, some aspects of the invention might be appreciated by grouping the modules 300*a*-300*h* into multiple groups and limiting the series switch to just those modules in each group, while letting the various groups charge in parallel. It may also be that much higher voltage may be desired when switched to the charging mode. Indeed, some recognized embodiments are configured to switch from 36 volt modules in parallel discharge to 920 volt charging configuration.

According to another embodiment, FIG. 9 is a schematic diagram illustrating a charge management system, where the eight battery modules 300*a-h* are connected in parallel with bus bars 522, 524. During operation of the forklift, the battery modules 300 are connected in a parallel by the switch 510 in the charger 500. In some embodiments, a Battery Operating System Supervisor (BOSS) module 600 is configured to control motor 514 and thus control switch positions of switch 510. As will be discussed in greater detail below, BOSS module 600 can control motor 514 to rotate arm 511 between a charging position (in which arm 511 connects modules 300*a*-300*h* in series) and an operation position (in which arm 511 connects modules 300*a*-300*h* in parallel). In some embodiments, BOSS module 600 is configured to control operation of switch 510, and in other embodiments, as has been previously described, controller 530 is configured to control operation of switch 510. Still in other embodiments, BOSS module 600 and controller 530 are configured to work together to control switch 510.

At any particular point in time, each battery module 300 may have a different state of charge, particularly as the module charges are drained through use in powering the forklift. The "state of charge" is defined as the percentage charge the module 300 currently has. Each module 300 may be at a different initial voltage due to differences in battery capacity or initial charge levels. Each module 300 has an integrated battery management system (BMS) 700. The BMS 700 monitors the health of the module 300 to include cell voltage, current, and temperature. Each module 300 is composed of a plurality of battery cells 710 connected in series and parallel via wire bonding and ultimately terminating into an integrated BMS 700. The wire bonding will be completed using a method similar to the Tesla ultrasonic friction welding method.

It is necessary for BOSS module 600 to serve as a battery management system for the modules 300*a-h*. But for the control of BOSS module 600, in such scenarios where the voltage in one module exceeds the others, the lower voltage battery modules would draw a current flow from the higher voltage modules into the lower voltage modules that would be only limited by resistance of the connectors, cells, bus bars, and bond wires. A large difference in voltage would cause high current flow to the battery module with lower voltage. These situations are undesirable because the current flow to the motor is reduced as current flows between battery modules, rather than out of the housing 100. If a high current is maintained for an extended period of time, or the voltage discrepancy is high enough such as to produce a current higher than the handling capability of the bond wires, it can also lead to battery failure by draining the battery rapidly or opening the bond wires.

There are a total of two bus bars which the modules 300 connect to. The negative terminals 310 of the modules 300 will either connect to positive bus bar 522 or the 0 V (ground) busbar 524. As previously described, the BOSS module 600 grants permissions to battery modules 300 to determine which are connected to the bus bars and which modules 300 are disconnected, by sending signals to the modules 300. Modules 300 then use MOSFET switches to connect and disconnect.

At the outset, it should be understood that module 300*d* is used here only as an example and that each module 300 is wired and employed in the same manner. Communication between the BOSS module 600 and the modules 300 is best understood by describing the low voltage six-pin connection 470. Five pins are "isolated," with one spare pin not currently utilized but may be employed later. The term "pin" is also used here when describing the wires corresponding to their respective pins in a wire harnesses of the BOSS 600. The isolated pins are grouped as part of an isolated wire harness. It will be understood by those of ordinary skill in the art that "isolated" refers to galvanic isolation. Transformers and digital isolators are used to separate the isolated wire harness from the main power supply. If an electrical short occurs in the isolated wire harness, there is no risk of damage to the rest of the circuits in the system. The isolated wire harness is depicted as the upper dashed line connected to module 300*d*. Isolated wire harness also connects to the vehicle bus 920. The vehicle bus 920 is the communication network depicted by the multiple dashed lines. When a module 300*d* is connected the BOSS module 600, a pull-up or pull-down resistor allows the BOSS 600 to detect the module. Once detected, a pulse train of a specific frequency is transmitted from the BOSS 600 to the battery module 300*c* which defines the CAN address for the module 300*c*. There are two pins for communication between module 300*c* and BOSS module 600; particularly, there is a CAN HI pin and a CAN LO pin. Lastly, there is a ground pin on the isolated wire harness. Once an address and communication are established, the BOSS module 600 can then grant permissions to module 300*d* to connect to the bus bars.

An example of the importance of the BOSS module 600 can be understood from a scenario in which, during continuous operation of a forklift, one module 300*d* has a fault. While the fault persists, the state of charge of module 300*d* will not change while the others will. Once the fault clears, module 300*d* will be ready to engage, but will not do so due to the difference in stage of charge. The BOSS will permit the modules with higher state of charge to engage the bus, and once their state of charge has realigned with the orphaned module 300*d*, the orphaned module 300*d* will be permitted to engage. For example, a forklift carrying a load and driving up a hill would require a lot of current. The BOSS module 600 does not control the disconnection and connection of modules 300 from the bus bars. BOSS module 600 only grants permissions to the modules 300 for the conditions when they are able to connect and disconnect. Each module 300*a*-300*h* uses internal MOSFET switches 903*a*-903*h* to rapidly open and close the circuit connections from the modules 300 to the bus bars. Once a fully charged module 300*d* is connected, a module 300 at a lower state of charge can disconnect. For example, if module 300*f* is at 60% and the other modules 300 are above 80%, module 300*f* will disconnect and only reconnect once the other states of charge decrease to about 60%.

For at least these reasons, BOSS module 600 in housing 100, to the extent networked, is designed to monitor the states of charge in each module 300 and will grant permission for a module 300 that varies by more than some threshold to disconnect. This allows the forklift to continue operating without hindering performance. The specific 36 V battery modules are used in preferred embodiments, but alternative embodiments can use various voltages depending on the needs of the particular lift truck.

Turning to FIG. 10, which is a schematic diagram of an embodiment of the charging configuration according to another embodiment, where two groups of four battery modules 300 are arranged by switch 510 in the charger in parallel, and those parallel groups are placed in series to achieve a system voltage twice that of an individual module's voltage.

But for the control of BOSS 600, in such scenarios where the voltage in one module exceeds the others, the lower voltage battery modules would draw a current flow from the higher voltage modules into the lower voltage modules that would be only limited by resistance of the connectors, cells, bus bars, and bond wires. A large difference in voltage, will cause high current flow to the battery module with lower voltage. These situations are undesirable because the current flow to the motor is reduced as current flows between battery modules, rather than out of the battery. If a high current is maintained for an extended period of time, or the voltage discrepancy is high enough such as to produce a current higher than the handling capability of the bond wires, it can also lead to battery failure by draining the battery rapidly or opening the bond wires.

For these reasons, the main BOSS 600, to the extent networked, is designed to monitor the voltages in each module and will disconnect a module that varies by more than a tolerable threshold. This allows the forklift to continue operating without hindering the performance. Specific 36 V battery modules are used as an example as alternative embodiments can use various voltages depending on the needs of the particular lift truck.

Other alternative embodiments of battery monitoring system architecture are contemplated within the scope of the present invention. In one embodiment, each battery module contains a slave PC board with only a digital isolator and a multi-cell battery stack monitor. Each module 300 has an independent interface connection to a master controller board with a microcontroller, a CAN interface, and a galvanic isolation transformer. The master controller board centrally manages module temperature, voltages, and engagement/disengagement, in addition to providing the gateway to the forklift's main CAN bus. Other alternative configurations can be achieved using the same method described. One such embodiment can include the battery modules 300 in different configurations, such as all of the modules 300 in series. Or another embodiment can have four modules 300 in parallel which are then in series with the other four modules 300.

In another alternative embodiment, each multi-cell battery stack monitor (MBSM) is on a PC board within each battery module. The BMS 700 also contains a CAN transceiver and a galvanic isolation transformer. Each module communicates through the MBSM non-isolated serial interface. This structure requires a 3- or 4-conductor cable connected between battery modules. Only one microcontroller controls all the battery monitors through the bottom monitor integrated circuit. This microcontroller also serves as the gateway to the forklift's main CAN bus.

Another contemplated embodiment has no monitoring and control circuitry within any of the battery modules. One PC board has 3 MBSM integrated circuits (for 3 modules), each of which is connected to a battery module. The MBSM devices are able to communicate through non-isolated serial interfaces. One microcontroller controls all the battery monitors through the serial interface and is the gateway to the forklift's main CAN bus. Similar to the preceding disclosed embodiments, a CAN transceiver and a galvanic isolation transformer complete the BMS.

Figure 11:
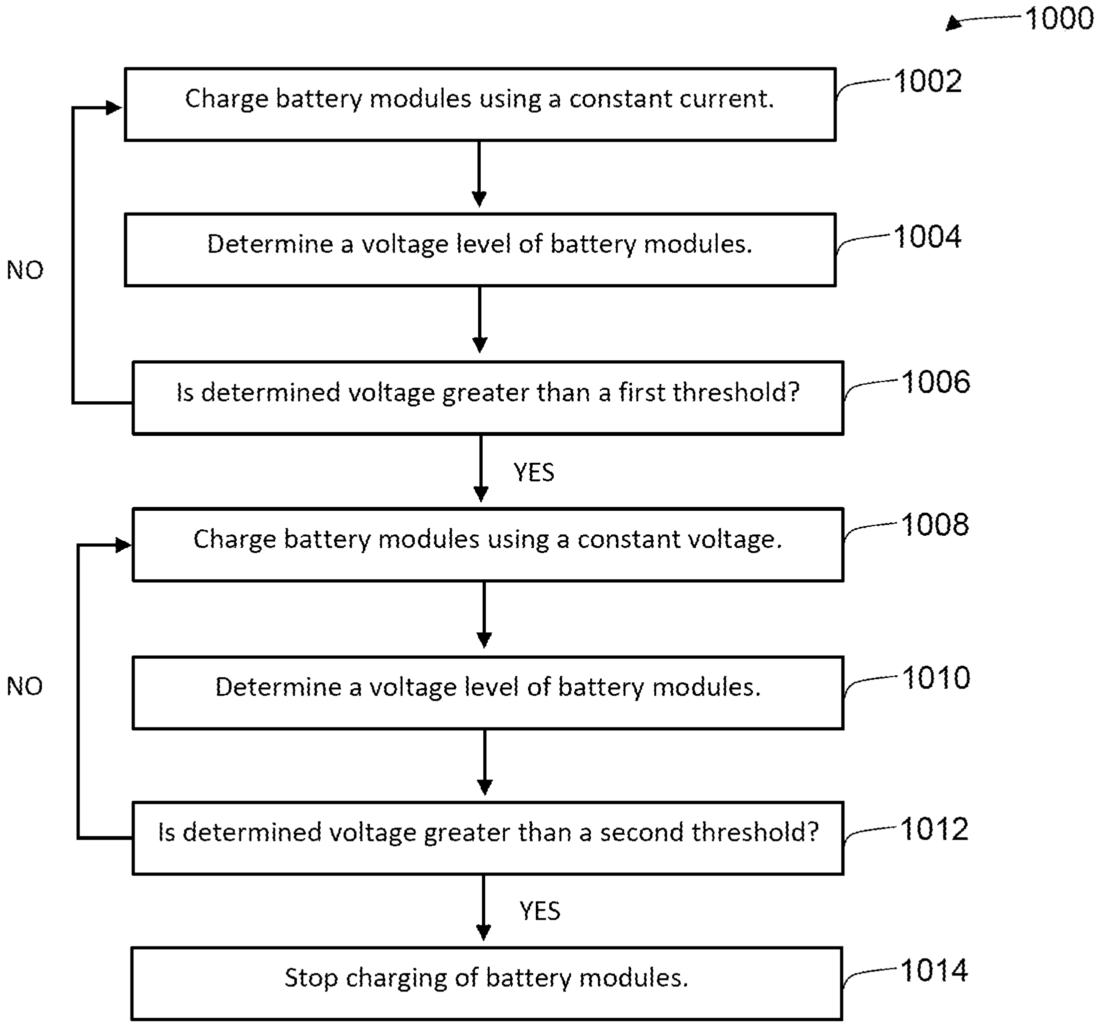
FIG. 11 is a flowchart illustrating a method of charging the battery assembly according to an embodiment of this disclosure.

FIG. 11 illustrates a method 1000 of charging battery modules 300 of battery assembly 10 by power source 200 coupled with charging port 520. Method 1000 can be performed by charging assembly 500, and specifically can be programmed to a memory of and performed by controller 530. Method 1000 can begin at block 1002 by controlling the voltage/current regulator 528 to charge battery modules 300 using at a constant current. Charging lithium-ion battery cells 324 with a constant current is done by preferred embodiments, in part, to increase the charging speed. In addition, by achieving a higher voltage charge, the present invention enables the coils and other components of charger 500 to be relatively smaller in size. As a result, the smaller size of the charger 500 further enables the inclusion of charger 500 within the portable battery housing 100.

Referring again to FIG. 11, method 1000 can continue at block 1004 by determining a voltage level of each of the battery modules 300 using voltage readings from voltage monitor 526. Method 1000 can continue at block 1006 by determining whether the voltage level of the battery modules 300 is greater than a predetermined first threshold. In response to determining that the voltage levels of the modules 300 is less than the first threshold, method 1000 can continue to block 1002 and continue charging the battery modules 300 using a constant current. In response to determining that the voltage levels of modules 300 is greater than the first threshold, the method 1000 can continue to block 1008 by controlling the voltage/current regulator 528 to charge the battery modules 300 at a using a constant voltage. Blocks 1002-1008 can be performed to increase the charging speed of modules 300 without overcharging the modules. For example, in some embodiments, the first threshold can be set to be 80% of the module's 300 voltage capacity. Thus, method 1000 can be performed to quicky charge the modules 300 using a constant current when the voltage of the modules is less than 80% of the total capacity, and then charge the modules 300 using a constant voltage after to charge modules 300 when the modules 300 are charged past 80% of their total voltage capacity to ensure the modules are not damaged from over charging.

Optionally, method 1000 continues at block 1010 by determining the voltage levels of the modules 300 using voltage monitor 526 while modules 300 are being charged at the constant voltage. Method 1000 can continue at block 1012 by determining whether the voltage level of the battery modules 300 is greater than a second predetermined threshold value. In response to determining that the voltage level of the battery modules is less than the second threshold value, method 1000 continues at block 1008 by controlling the voltage/current regulator/current 528 to continue to charge the battery modules 300 using a constant voltage. In response to determining that the voltage level of the battery modules 300 is greater than the second threshold value, method 1000 continues at block 1014 by controlling voltage/current regulator 528 to stop charging battery modules 300. In some embodiments, the second threshold level is a fully charged voltage capacity level of the battery modules 300. Thus, after battery modules 300 are completely charged, the controller 530 controls the voltage/current regulator 528 to stop charging of the battery modules 300 so that the modules 300 are not damaged by being overcharged. Those with skill in the art will understand that, in various embodiments, method 1000 can be performed with more or less steps than what has been explicitly described without departing from the scope of his disclosure. Further, the blocks 1002-1014 have been described as occurring in certain orders, but those with skill in the art understand that the blocks 1002-1014 described can occur in any of a number of orders without departing from the scope of this disclosure.

Other Alternatives

Although the present invention has been described in terms of the foregoing disclosed embodiments, this description has been provided by way of explanation only and is not intended to be construed as a limitation of the invention. For instance, despite reference to Class I and II forklifts as such, it should be understood that some aspects of the invention may have broader application with other types of battery-powered industrial trucks. Indeed, even though the foregoing descriptions refer to numerous components and other embodiments that are presently contemplated, those of ordinary skill in the art will recognize many possible alternatives that have not been expressly referenced or even suggested here. While the foregoing written descriptions should enable one of ordinary skill in the pertinent arts to make and use what are presently considered the best modes of the invention, those of ordinary skill will also understand and appreciate the existence of numerous variations, combinations, and equivalents of the various aspects of the specific embodiments, methods, and examples referenced herein.

Hence the drawings and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention.

Accordingly, in all respects, it should be understood that the drawings and detailed descriptions herein are to be regarded in an illustrative rather than a restrictive manner and are not intended to limit the invention to the particular forms and examples disclosed. In any case, all substantially equivalent systems, articles, and methods should be considered within the scope of the invention and, absent express indication otherwise, all structural or functional equivalents are anticipated to remain within the spirit and scope of the presently disclosed systems and methods.

What is claimed is:

1. A battery assembly, comprising:

a plurality of battery modules, each battery module of the plurality of battery modules including a positive module terminal and a negative module terminal;

a charging assembly electrically coupled with the negative module terminal and the positive module terminal of each battery module of the plurality of battery modules, including:

a plurality of positive module contacts, each positive module contact of the plurality of positive module contacts electrically coupled with one of the positive module terminals, a plurality of negative module contacts, each negative module contact of the plurality of negative module contacts electrically coupled with one of the negative module terminals, a power supply plug configured to deliver electrical energy from the plurality of battery modules to an electronic device powered by the battery assembly, a power charging port configured to be coupled with and receive electrical energy from a power source for charging the plurality of battery modules, and a mechanism configured to connect the plurality of battery modules in a parallel connection and reconfigure the parallel connection of the plurality of battery modules from the parallel connection to a series connection.

2. The battery assembly of claim 1, further comprising:

a positive busbar and a negative busbar, each configured to be electrically coupled with the positive module terminals and the negative module terminals and electrically coupled to the power supply plug.

3. The battery assembly of claim 1, further comprising a contact arm, wherein the contact arm is electrically coupled with the power supply plug and the power charging port, and configured to be positioned in a charging position for charging of the plurality of battery modules and in an operation position for discharging of the plurality of battery modules.

4. The battery assembly of claim 3, wherein the contact arm comprises a plurality of busbar contacts, wherein the plurality of busbar contacts is configured to electrically couple the positive module contacts and the negative module contacts with positive and negative busbars.

5. The battery assembly of claim 4, wherein:

in the charging position, the busbar contacts are positioned to connect the plurality of battery modules and the positive and the negative busbars in series; and in the operation position, the busbar contacts are positioned to connect the plurality of battery modules and the positive and the negative busbars in parallel.

6. The battery assembly of claim 3, wherein:

in the operation position, the plurality of battery modules is configured to be discharged at a first voltage;

in the charging position, the plurality of battery modules is configured to be charged at a second voltage; and the second voltage is larger than the first voltage by an order of magnitude substantially equal to a number of the plurality of battery modules.

7. The battery assembly of claim 1, wherein:

the electronic device is a vehicle;

the battery assembly further comprises a battery assembly housing sized to be replaceably installed within a battery assembly compartment of the vehicle; and the plurality of battery modules and the charging assembly are disposed within the battery assembly housing.

8. The battery assembly of claim 7, wherein the charging assembly is disposed within the battery assembly housing adjacent to a first end of each battery module of the plurality of battery modules.

9. The battery assembly of claim 1, wherein the charging assembly further comprises:

a voltage monitor configured to measure a voltage level of each battery module of the plurality of battery modules; and a voltage regulator configured to regulate the electrical energy supplied from the power source to the plurality of battery modules.

10. The battery assembly of claim 9, further comprising an actuator configured to rotate a contact arm and a supervisory controller configured to control charging and discharging operations of the battery assembly, the supervisory controller configured to:

control the actuator to rotate the contact arm to a charging position for charging of the plurality of battery modules by the power source; and control the actuator to rotate the contact arm to an operation position for discharging of the plurality of battery modules for powering the electronic device;

determine the voltage level of each battery module of the plurality of battery modules using measurements taken by the voltage monitor;

compare the voltage level of each battery module of the plurality of battery modules to a first threshold voltage level;

in response to the voltage level of each battery module of the plurality of battery modules being less than the first threshold voltage level, control the voltage regulator to deliver the electrical energy to the plurality of battery modules from the power source using a constant current; and in response to the voltage level of each battery module of the plurality of battery modules being larger than the first threshold voltage level, control the voltage regulator to deliver the electrical energy to the plurality of battery modules from the power source using a constant voltage.

11. The battery assembly of claim 10, wherein the supervisory controller is further configured to:

compare the voltage level of each battery module of the plurality of battery modules to a second threshold voltage level, wherein the second threshold voltage level is larger than the first threshold voltage level; and in response to the voltage level of each battery module of the plurality of battery modules being above the second threshold voltage level, control the voltage regulator to stop the delivery of electrical energy to the plurality of battery modules from the power source.

12. The battery assembly of claim 10, wherein the supervisory controller is further configured to:

compare the voltage level of each battery module of the plurality of battery modules to a second threshold voltage level, wherein the second threshold voltage level is larger than the first threshold voltage level; and in response to the voltage level of each battery module of the plurality of battery modules being below the second threshold voltage level, control the voltage regulator to deliver the electrical energy to the plurality of battery modules from the power source using a constant voltage.

13. A battery assembly, comprising:

a plurality of battery modules disposed within a battery assembly housing, each battery module of the plurality of battery modules including a module positive terminal and a module negative terminal; and a battery module charging assembly electrically coupled with the module negative terminal and the module positive terminal of each battery module of the plurality of battery modules and disposed within the battery assembly housing, the battery module charging assembly including:

a power supply plug configured to deliver electrical energy from the plurality of battery modules to an electronic device powered by the battery assembly, a power charging port configured to be coupled with and receive electrical energy from a power source for charging the plurality of battery modules, and control circuitry configured to control charging operations of the battery assembly, the control circuitry including:

a voltage monitor configured to measure voltage levels of the plurality of battery modules, a voltage regulator configured to regulate the electrical energy supplied from the power source to the plurality of battery modules, and a supervisory controller configured to control the voltage regulator based on the voltage levels of the plurality of battery modules, wherein the supervisory controller is electrically coupled with the voltage monitor and the voltage regulator and further configured to:

in response to the voltage levels of the plurality of battery modules being less than a first threshold voltage level, control the voltage regulator to deliver the electrical energy to the plurality of battery modules from the power source using a constant current; and in response to the voltage levels of the plurality of battery modules being greater than the first threshold voltage level, control the voltage regulator to deliver the electrical energy to the plurality of battery modules from the power source using a constant voltage.

14. The battery assembly of claim 13, wherein:

the electronic device is a vehicle; and the battery assembly housing is sized to be replaceably installed within a battery assembly compartment of the vehicle.

15. The battery assembly of claim 13, wherein the battery module charging assembly is disposed within the battery assembly housing adjacent to a first end of each battery module of the plurality of battery modules.

16. The battery assembly of claim 13, wherein the supervisory controller is further configured to:

in response to the voltage levels of the plurality of battery modules being above a second threshold voltage level, control the voltage regulator to stop the delivery of electrical energy to the plurality of battery modules from the power source, and in response to the voltage levels of the plurality of battery modules being below the second threshold voltage level, control the voltage regulator to deliver the electrical energy to the plurality of battery modules from the power source using a constant voltage.

17. The battery assembly of claim 16, wherein:

the battery assembly further comprises a positive busbar and a negative busbar, each configured to be electrically coupled with each module positive terminal of the plurality of module positive terminals, each module negative terminal of the plurality of module negative terminals, the power supply plug, and the power charging port.

18. The battery assembly of claim 17, wherein the battery module charging assembly further comprises:

a plurality of positive module contacts, wherein each positive module contact of the plurality of positive module contacts is electrically coupled with one of the module positive terminals, a plurality of negative module contacts, wherein each negative module contact of the plurality of negative module contacts is electrically coupled with one of the module negative terminals, a contact arm including a plurality of busbar contacts, wherein the plurality of busbar contacts is configured to couple the positive module contacts and the negative module contacts with the positive and negative busbars, and an actuator configured to rotate the contact arm about a rotation axis of the contact arm.

19. The battery assembly of claim 18, wherein:

in an operation position of the contact arm, the plurality of battery modules is configured to be discharged at a first voltage;

in a charging position of the contact arm, the plurality of battery modules is configured to be charged at a second voltage; and the second voltage is larger than the first voltage by an order of magnitude substantially equal to a number of the plurality of battery modules.

20. The battery assembly of claim 18, wherein the supervisory controller is further configured to:

control the actuator to rotate the contact arm to a charging position for charging of the plurality of battery modules by the power source, wherein in the charging position the busbar contacts are positioned to connect the plurality of battery modules and the positive and the negative busbars in series; and control the actuator to rotate the contact arm to an operation position for discharging of the plurality of battery modules for powering the electronic device, wherein in the operation position the busbar contacts are positioned to connect the plurality of battery modules and the positive and the negative busbars in parallel.

* * * * *